US007925557B1

(12) United States Patent
Ficery et al.

(10) Patent No.: US 7,925,557 B1
(45) Date of Patent: *Apr. 12, 2011

(54) COST ANALYSIS AND REDUCTION TOOL

(75) Inventors: Kristin L. Ficery, Atlanta, GA (US); Michael Kirk Ostergard, Marietta, GA (US)

(73) Assignee: Accenture Global Services Limited, Dublin (IE)

( * ) Notice: Subject to any disclaimer, the term of this patent is extended or adjusted under 35 U.S.C. 154(b) by 972 days.

This patent is subject to a terminal disclaimer.

(21) Appl. No.: 10/802,861

(22) Filed: Mar. 18, 2004

Related U.S. Application Data

(63) Continuation-in-part of application No. 10/609,690, filed on Jul. 1, 2003.

(51) Int. Cl.
*G06Q 40/00* (2006.01)

(52) U.S. Cl. ............................ 705/35; 705/38; 705/36 T

(58) Field of Classification Search ........................ None
See application file for complete search history.

(56) References Cited

U.S. PATENT DOCUMENTS

| | | | | |
|---|---|---|---|---|
| 5,132,899 A * | 7/1992 | Fox | ............................... | 705/36 R |
| 5,848,396 A * | 12/1998 | Gerace | ............................ | 705/10 |
| 5,946,667 A * | 8/1999 | Tull et al. | ..................... | 705/36 R |
| 6,088,676 A * | 7/2000 | White, Jr. | ............................ | 705/1 |
| 6,363,497 B1 * | 3/2002 | Chrabaszcz | ..................... | 714/13 |
| 6,832,211 B1 * | 12/2004 | Thomas et al. | .............. | 705/36 R |
| 6,983,320 B1 * | 1/2006 | Thomas et al. | ................ | 709/224 |
| 6,988,092 B1 * | 1/2006 | Tang et al. | .......................... | 707/1 |
| 7,139,813 B1 * | 11/2006 | Wallenius | ..................... | 709/219 |
| 2002/0042751 A1 * | 4/2002 | Sarno | ................................ | 705/26 |
| 2003/0120577 A1 * | 6/2003 | Sakui et al. | ..................... | 705/36 |
| 2003/0158749 A1 * | 8/2003 | Olchanski et al. | ................ | 705/2 |
| 2003/0172013 A1 * | 9/2003 | Block et al. | ..................... | 705/33 |
| 2003/0172014 A1 * | 9/2003 | Quackenbush et al. | ......... | 705/35 |
| 2004/0030592 A1 * | 2/2004 | Buck et al. | ....................... | 705/10 |
| 2004/0039619 A1 * | 2/2004 | Zarb | ................................ | 705/7 |
| 2004/0039676 A1 * | 2/2004 | Trainer | ........................... | 705/35 |
| 2004/0073441 A1 * | 4/2004 | Heyns et al. | ....................... | 705/1 |
| 2004/0073442 A1 * | 4/2004 | Heyns et al. | ....................... | 705/1 |
| 2004/0073467 A1 * | 4/2004 | Heyns et al. | ....................... | 705/7 |

(Continued)

OTHER PUBLICATIONS

Medtronic's chairman William George on how mission-driven companies create long-term shareholder value; William W George; The Academy of Management Executive; Nov. 2001; 15, 4; 9 pages.*

(Continued)

*Primary Examiner* — Alexander Kalinowski
*Assistant Examiner* — Gregory Johnson
(74) *Attorney, Agent, or Firm* — Finnegan, Henderson, Farabow, Garrett & Dunner, LLP

(57) ABSTRACT

Disclosed are systems and related methods for performing cost reduction analyses, and selecting and implementing appropriate cost reduction programs. The systems include electronically enabled tools for automatically performing cost analyses, identifying cost levers, and selecting cost reduction strategies targeting those cost levers. Disclosed embodiments examine a target company's financial data and detect the key levers or drivers that affect the company's cost structure. Thereafter, the identified cost levers are linked to one or more pertinent business capability recommendations where each linked capability recommendation is tailored to provide at least one element of a cost reduction strategy adapted to address one or more of the identified levers. Further, business capability overviews are provided for each capability recommendation, where the overview can contain case studies, implementation plans, integration implications, sample benefit and impact forecasts and other relevant information pertaining to the understanding, assessment and implementation of that particular capability recommendation.

32 Claims, 12 Drawing Sheets

U.S. PATENT DOCUMENTS

2004/0186765 A1* 9/2004 Kataoka .......................... 705/10
2005/0171918 A1* 8/2005 Eden et al. .................... 705/400

OTHER PUBLICATIONS

A value-based analysis of specialty chemical companies; David Begleiter; Chemical Market Reporter; May 28, 2001; 259, 22; 3 pages.*

Shareholder Value, Stakeholder Management, and Social Issues: What's the Bottom Line?; Amy J. Hillman and Gerald D. Keim; Ivey School of Business, University of Western Ontario, London, Ontario, Canada; Strategic Management Journal; Strat. Mgmt. J., 22: 125-139 (2001); 15-pages.*

Successful growth models for the chemical industry: New models set a future course; John Aalbregtse and David Davies; Chemical Market Reporter; New York: Jun. 3, 2002. vol. 261, Iss. 22; 8-pages.*

The Relationship between Growth, Profitability, and Firm Value; Nikhil Varaiya, Roger A. Kerin and David Weeks; Strategic Management Journal, vol. 8, No. 5 (Sep.-Oct. 1987); 12-pages.*

Environmental Shareholder Value: Economic Success With Corporate Environmental Management; Stefan Schaltegger and Frank Figge; Eco-Management and Auditing; Eco-Mgmt. Aud. 7, 29-42 (2000); 14-pages.*

* cited by examiner

Cost Reduction Strategy Explorer

| Contents | Index |
|---|---|

- Home
- Capabilities
- Value Creating Oppor
- Value Network Mode
- Enterprise Process An
- Enterprise Process So
- Capability Sourcing M
- Enterprise Process Re
- Reference Materials

800

| Home | Site Map | Resources | Help |
|---|---|---|---|

Value Creating Opportunities    Capabilities    Value Network Model eLearning    801

802    Table of Contents

* Intro * Leading Practices * Benefits * Considerations * Implications * Case Studies * Representative Solution Providers * Value Creating Opportunities * Value Network Relationships * Subprocesses * Related Capabilities * Footnotes

Definition:

Disseminate knowledge more effectively and efficiently through electronic channels. Teaching and knowledge management modules that focus on business simulation, legal education, virtual university training, work and process integration, organizational education, and extended enterprise which offer web-based training, student collaboration, and value chain education and development. This capability is most applicable for enterprises that desire employees with market-influencing skills. The enterprise can reduce organizational learning costs and deliver value-added capabilities to the workforce.

Introduction:

The rapid evolution of technology and enterprise capabilities makes it difficult to keep organizational skills up-to-date. As technology breaks down geograpyhic and time barriers, enterprises are experiencing increased global competition. Innovative ways of information sharing with alliance partners is required as distributor and retailer

Fig. 8

Recommendation Name: eLearning

Duration. Release 1 - 3 months, R2 - 6 Months

Economics — 900

| | 901 | | |
|---|---|---|---|
| | | Benefits | Costs |
| One Time | | $23  50 m | $xx   yy m |
| Recurring | | $30 - 50 m | -- |
| NFV $xx m | | IRR xx% | Payback xyears |

Objective
Generate human resource efficiencies across the entire enterprise by leveraging electronic learning capabilities. Improve retention, skills, and filed staff performance.

Description
Disseminate knowledge more effectively and efficiently through electronic channels, teaching and knowledge management modules that focus on business simulation, legal education, visual university training, work and process integration, organizational education, and extended enterprise which offer web-based training, student collaboration, and value chain education and development. This capability is most applicable for enterprises that desire employees with market-influencing skills. The enterprise can reduce organizational learning costs and deliver value-added capabilities to the workforce.   902

Implementation Approach
1. Analysis and Design
2. Release 1 -- US Integration
3. Release 2 -- Global Integration

Responsibility
Tiger Team
VP, Operations
VP, Human Resources

Timing
|     | Q1 | Q2 | Q3 | Q4 |
|-----|----|----|----|----|
|     | ***** | *********** | ******************** |    |

903

Key Cost Considerations — 904
* Analysis: $ xx - $ yy
* Software Integration: $ xx - $ yy m
* Training: $ xx -- yym
* Elimination of personnel: $xx -- yy ($xx per person)

Key Benefits — 905
* 40% reduction in training costs and 36% increase in course enrollment
* 30% reduction in course time
* 20% increase in course performance
* Company revenues surpass expenses 10-to-1
* 20% increase in profitability and 53% increase in business efficiency

Fig. 9

COST ANALYSIS AND REDUCTION TOOL

CROSS REFERENCE TO RELATED APPLICATIONS

The present application is a continuation-in-part of U.S. non-provisional application Ser. No. 10/609,690, filed Jul. 1, 2003, the subject matter of which is hereby incorporated by reference in full.

FIELD OF THE INVENTION

The present invention relates to a system and related methods for performing cost reduction analyses, and selecting and implementing appropriate cost reduction programs. More particularly, the present invention pertains to electronically enabled tools for automatically performing cost analyses, identifying cost levers, and selecting cost reduction strategies targeting those cost levers.

BACKGROUND OF THE INVENTION

In times of economic downturn, the focus of many companies turns to reducing costs as a means to maintain profitability. Frequently, such cost cutting measures focus on "quick fix" mechanisms such as cuts in fringe benefits, staffing reductions, and business travel cut backs. Often, such quick fix cost cutting mechanisms produce beneficial effects only in the short term as they may lead to coincidental declines in production or resource shortages once market conditions improve. In times of economic downturn, it is often beneficial for modern companies to rethink their cost reduction priorities and focus on improved large-scale cost reduction efforts.

Quick fix cost reduction approaches are still relevant to today's companies, mostly because these approaches are easy to implement and the direct cost savings from the approaches are easy to identify and quantify. However, various innovative companies have identified and successfully exploited new cost reduction actions that can be used to drive significant results by restructuring costs and the way in which work is performed. Such new restructuring actions can include the implementation of electronically enabled integration systems (providing capabilities such as real-time supply chain collaboration, sales force automation, and work force coordination), identifying sourcing alternatives for business functions (such as manufacturing, information technology, and human resources), and using new and emerging technology applications (such as mobile computing and embedded/intelligent sensors). For example, introducing infrastructure changes, such as the employment of electronically enabled communication and integrations capabilities, can reduce costs and improve performance. Such changes can also fundamentally change a company's cost structure so that it is more scalable and flexible in various economic conditions.

Restructuring-based cost reduction strategies, however, are more difficult to implement, have longer time horizons, and thus are more difficult to analyze in terms of impact. These difficulties make restructuring-based cost reduction strategies typically more risky, and, therefore, companies are hesitant to implement or even consider ambitious restructuring-based cost reduction strategies without having carefully and fully researched them and obtained reliable positive forecasts of success.

Generally, business managers are trained to seek guidance by analyzing case studies, which include anecdotal analyses regarding particular strategies that worked or did not work under a certain set of circumstances, that summarize the actions taken and results obtained by similar companies under similar circumstances. To limit the risk in implementing a restructuring-based cost reduction strategy, a business manager generally would prefer to have first identified a case study concerning a similarly situated company, then have analyzed how that similarly situated company had successfully implemented a given cost restructuring plan, and finally have concluded that at least some portions of that plan could be successfully adapted to the business manager's needs. However, many factors limit the usefulness of cost reduction case studies and make meaningful forecasting regarding the impact of cost reduction strategies inherently difficult.

Case studies have the most relevance and usefulness to those companies that have similar situations to the company described in the case study. Unfortunately, the positions of no two companies are absolutely identical. Therefore, in applying a case study approach it is necessary to identify appropriate case studies that have some similarity to and therefore the possibility of some applicability to the target company's situation.

While a comparison of a target company to companies described in case studies can be made using financial data, those in the business community understand that financial data regarding companies, whether public or private, is often provided in various different yet legally acceptable forms that make straightforward comparisons misleading or altogether inaccurate. There are various known financial indicators, measurements, metrics and ratios that are commonly used to evaluate a given company's financial performance and health in comparison to other companies. Two such metrics commonly used for this purpose are Return on Equity ("ROE"), which is defined in Equation 1 below, and Return on Assets ("ROA"), which is defined in Equation 2 below.

$$\text{Return on Equity} = \frac{\text{Net Income}}{\text{Shareholders Equity}} \quad \text{(Eq. 1)}$$

$$\text{Return On Assets} = \frac{\text{Net Income}}{\text{Assets}} \quad \text{(Eq. 2)}$$

Each financial metric, such as ROE and ROA, has its own use and purpose, and each is more or less suitable and/or accurate depending upon a variety of factors. In the business world, therefore, one commonly examines a variety of such metrics to get a more complete picture of the financial status of a company in comparison to its peers.

Importantly, results from simple calculations of such metrics utilizing publicly available information frequently can be misleading. This makes it difficult to make meaningful comparisons of companies and examine the relative effectiveness of cost cutting policies within different companies because of the inability to gauge the extent of similarity of a target company with a company described in a case study. With respect to many metrics calculated from public information, standardization of these metrics can be difficult due to the variability introduced by Generally Accepted Accounting Principles ("GAAP") and international differences in accounting practices. While publicly traded companies may be legally required to provide, or may voluntarily provide, various accounting and financial disclosures to assist the public in valuing a company and thus the valuing of that company's stock and/or performance, these disclosures provide data that inherently is subject to different kinds and extents of complex factors that influence the data.

In particular, most publicly traded companies are required to submit financial data on a regular basis to the United States Securities and Exchange Committee ("SEC") which then publishes this information electronically to the public. Specifically, the SEC requires relatively larger public companies to file registration statements, periodic financial reports, and other forms electronically through the Electronic Data Gathering, Analysis and Retrieval ("EDGAR") database. The public can access this information for free, such as through a government Internet portal. Financial data on many publicly traded companies is also available through commercial services such as Standard and Poor's Compustat database or Thomson Financial's Global Access database. Many companies also voluntarily disclose various financial data to potential investors and the general public.

While readily available, publicly disclosed financial information and metrics calculated from such information cannot be readily compared among differing companies or time frames due to the lack of standardization identified above. For example, Net Income, as used in Equations 1 and 2 above, is highly dependent on the accounting quality of earning measurements because Net Income is intended to capture non-operating income and expense (such as interest expense) and is, therefore, subject to companies attempting to manage earnings reports. Similarly, there is a wide disparity in the calculation of Net Income from one country to another. Furthermore, Net Income may be misleading because companies that have been highly involved in acquisitions tend to have higher non-cash charges (e.g., amortization) that result in lower new income. In the same way, the Assets and Equity values used in Equations 1 and 2 may vary because of international differences that create a wide disparity in how assets are recorded from country to country. Also, the assets and equity quantities may be misleading because of accounting anomalies, such as acquisitions in which a seller may sell fully depreciated assets to a buyer who must record assets equal to fair value at the time of purchase. Similar problems also exist with the other commonly used metrics of business performance because of GAAP limitations and international differences in accounting practices.

As a consequence of inconsistencies with respect to how different entities report similar matters, it is inherently difficult to analyze and compare data from other companies in an easy, yet meaningful, way. The information from readily available financial statements and filings, such as from the EDGAR or commercial databases, unfortunately is difficult to comprehend without processing that requires a high level of skill and time consuming, expensive labor. Likewise, the complexity and variation in financial statements as described above likewise often makes it difficult and expensive for many companies to analyze their own financial performance. From the standpoint of businesses, it is difficult to identify cost drivers and examine cost cutting strategies because the most readily available and complete financial data is compiled for the purpose of financial statements and tax filings. Given the inaccuracies built into financial data numbers via tax and accounting conventions, companies are left with the non-ideal options of collecting raw data or attempting to use financial data while correcting for any systematic inaccuracies.

Since companies often encounter these difficulties when trying to quantitatively and accurately compare their performance and business situation with those of their peers, they likewise find it difficult to gauge whether certain cost reduction strategies that have been employed successfully by other companies (and restructuring-based cost reduction strategies in particular) will have similar desirable impacts for them. A company considering restructuring to reduce costs needs the ability to accurately compare its financial position and metrics to that of companies the have successfully and/or unsuccessfully employed similar cost reduction strategies. In this manner, more effective use can be made of case studies and trade publications.

Therefore, companies need improved mechanisms for identifying and implementing cost cutting strategies that overcome the inherent difficulties in objectively measuring and benchmarking financial data and metrics (e.g., net sales, gross sales, profitability, market share, research and development expenditures, labor force size, cash holdings, fixed costs, debt load, manufacturing capacity, assets allocation, etc.) that are used to measure and track a given company's respective value drivers and cost levers. A mechanism that allows simplified and objective analysis of the financial performance of a company and meaningful comparison of the company's performance with other companies to permit accurate identification of cost levers and value drivers, and that suggests potential cost saving strategies suitable for the company would provide significant value realization.

SUMMARY OF THE INVENTION

In light of the problems presented by the state of the art in analyzing and implementing cost reduction strategies, it is an object of one or more embodiments of the present invention to provide an electronic system, tool and related methods that allow for meaningful comparisons of the performance and status of companies using readily available financial data.

Further, it is an object of one or more embodiments of the present invention to provide an electronic system, tool and related methods that are adapted to accurately identify key cost levers within a company for targeting with subsequent appropriately tailored cost reduction strategies.

Also, it is an object of one or more embodiments of the present invention to provide an electronic system, tool and related methods that enable the identification of various cost reduction strategies and approaches suitable for providing beneficial impacts upon identified cost levers and drivers of interest to a particular company.

Additionally, it is an object of one or more embodiments of the present invention to provide an electronic system, tool and related methods that retain a compilation of case studies that are organized according to various cost reduction strategies such that case studies concerning various cost reduction strategies of particular interest can be identified within the compilation and then analyzed with respect to the situation of a target company.

Similarly, it is an object of one or more embodiments of the present invention to provide an electronic system, tool and related methods that enable a flexible cost reduction approach that is generally applicable various companies and that is capable of accelerating the cost reduction process, restructuring costs for sustainable benefits, and reducing the time lag to obtain positive results.

In response to these and other needs, the various embodiments of the present invention provide an electronic system, tool and related methods for automatically examining a company's financial data and detecting the key levers or drivers that affect the company's cost structure, and, in turn, profitability. The embodiments of the invention thereafter link the identified cost levers to one or more pertinent business capability recommendations where each linked capability recommendation is tailored to provide at least one element of a cost reduction strategy adapted to target one or more of the identified levers. Further, the embodiments of the invention provide a business capability overview for each capability recommendation, where the overview can contain case studies, implementation plans, integration implications, sample benefit and impact forecasts and other relevant information pertaining to the understanding, assessment and implementation of that particular capability recommendation. In this manner, a user is provided with a substantially simplified way to identify possible cost reduction strategies that may be of interest to the target company, as well as obtain useful information that provides guidance regarding the selection and implementation of those strategies.

Specifically, one embodiment of the present invention includes an electronic system on which operates a cost reduction analysis tool and a cost lever identification tool. The tools include software-driven applications and modules that automatically perform various steps of related cost lever identification methods and strategy selection functionality methods of the present invention. The two software driven tools operate in electronic communication to analyze the financial information of a company to identify key cost levers, and then assist in the selection of appropriate cost reduction strategies by which the company can effectively address those levers.

In such embodiments of the invention, the various modules of the cost lever analysis tool utilize various financial performance data as inputs to identify and provide metrics data and reports for the analysis of cost levers. The financial performance data used as an input to the cost lever analysis modules can include financial and stock price data (which may be publicly available or obtained through non-public sources) for a target company as well as selected other companies for sake of comparison. The cost lever analysis tool thereafter performs an analysis of the performance of the target company with respect to one or more other companies or industry baselines in terms of levers and drivers of shareholder value, or, in other words, the relative strength and weaknesses of the target company as reflected by various performance metrics. The modules of the cost lever analysis tool operate in concert to deconstruct the various elements that make up shareholder value into useful indicators and metrics. The cost lever analysis tool thereafter outputs various metric data values, and optionally compiles reports and comparison charts, which are indicative of and illustrate the performance of the target company with respect to the industry/market and/or the target company's peers/competitors. These performance comparisons thereby enable the target company to identify cost levers, and, therefore, areas within the target company that are suitable for further analysis regarding possible worthwhile cost reduction efforts.

In some preferred embodiments of the present invention, the cost lever analysis tool comprises a spreadsheet or other computerized program that is adapted to receive various financial data and user inputs and use these inputs to calculate spread, growth, and other metrics utilized to review the elements of total cost in a company and identify cost levers for targeting with cost reduction strategies.

Optionally, in preferred embodiments the present invention further evaluates the financial data of other publicly traded companies, such as those in the same industry, and compares the various factors affecting costs. Also optionally, such financial data for other companies or for an industry in general can be obtained automatically via a commercial electronic provider of such data.

Also, in embodiments of the present invention, cost levers identified through the cost lever analysis tool are used as a primary input by the cost reduction strategy tool. Like the cost lever analysis tool, the cost reduction strategy tool includes various logic modules that intercommunicate to provide outputs useful in assisting the target company in identifying, investigating, and implementing potentially useful cost reduction strategies, including a capability-linking module and a case study repository module. Using the various outputs of the cost lever analysis tool, the capability linking module of the cost reduction strategy tool provides suggested cost reduction strategies suitable for addressing the areas for cost reduction opportunities identified by the cost lever analysis tool. These cost reduction strategies are in the form of various business capability recommendations, with each of the business capability recommendations being linked by the linking module with one or more capability overviews, including case studies, implementation plans, and the like, that are associated with the leading and/or emerging best practices in one or more industries with respect to that capability. The case studies focus on the financial benefits achieved by particular business capabilities in certain circumstances and include results analyses in those cases providing benchmarking via certain financial metrics, including, for example, COGS, SG&A, and capital invested to support the capability. In this manner, appropriate cost reduction strategies for a target company can be identified.

Cost-reducing business capability recommendations, for example, can concern customer self-service extranet installations to give selected customers access to electronic information including order status and payment data. Similarly, a particular linked capability recommendation can concern a corporate intranet made accessible to employees that permits those employees to get self-service information about their benefits and other company data, or on-line catalog capabilities that can be established for use in internal procurement functions. Likewise, cost-reducing capabilities can include electronic procurement systems that, for example, support optimized and centralized procurement processes that are described in the related business capability overview as being successful in reducing the number of suppliers, developing strategic sourcing capabilities, or enabling the company to join new industry electronic marketplaces. Similarly, electronic customer service centers can be another type of capability recommendation with a capability overview that includes case studies showing how such service centers have allowed dynamic configuration and pricing quoting for customers, advanced order management functions, and other features of customer self-service to reduce customer service staffing costs.

As described herein, the systems and related methods of the present invention provide persons who need to analyze and enact measures to modify the cost structure of a company with the integrated capabilities of the cost reduction analysis tool and cost lever identification tool. The software-driven applications and modules of the tools automate the identification and selection, and planning for implementation of cost reduction programs that balance a portfolio of traditional cost reduction approaches and newer cost reduction actions to drive significant increases in profitability.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 7 and FIG. 8 are illustrations depicting user views of a cost reduction strategy tool according to embodiments of the present invention;

FIG. 9 is an illustration of the layout of a sample cost reduction strategy implementation plan template that can be produced according to embodiments of the present invention.

DETAILED DESCRIPTION OF THE PREFERRED EMBODIMENTS

Embodiments of the present invention enable managers of a given company to identify, select, and establish cost reduction programs that balance a portfolio of traditional cost reduction approaches and newer cost reduction actions to drive significant increases in profitability. The various embodiments of the present invention provide an electronic system, tools and related methods for automatically examining a company's financial data and detecting the key cost levers or cost drivers that affect the company's cost structure, and, in turn, profitability. The embodiments of the invention thereafter link the identified cost levers to one or more pertinent business capability recommendations where each linked capability recommendation is tailored to provide at least one element of a cost reduction strategy adapted to target one or more of the identified levers. Further, the embodiments of the invention provide a business capability overview for each capability recommendation, where the overview can contain case studies, implementation plans, integration implications, sample benefit and impact forecasts and other relevant information pertaining to the understanding, assessment and implementation of that particular capability recommendation. In this manner, a user is provided with a substantially simplified way to identify possible cost reduction strategies that may be of interest to the target company, as well as obtain useful information that provides guidance regarding the selection and implementation of those strategies.

Figure 1:
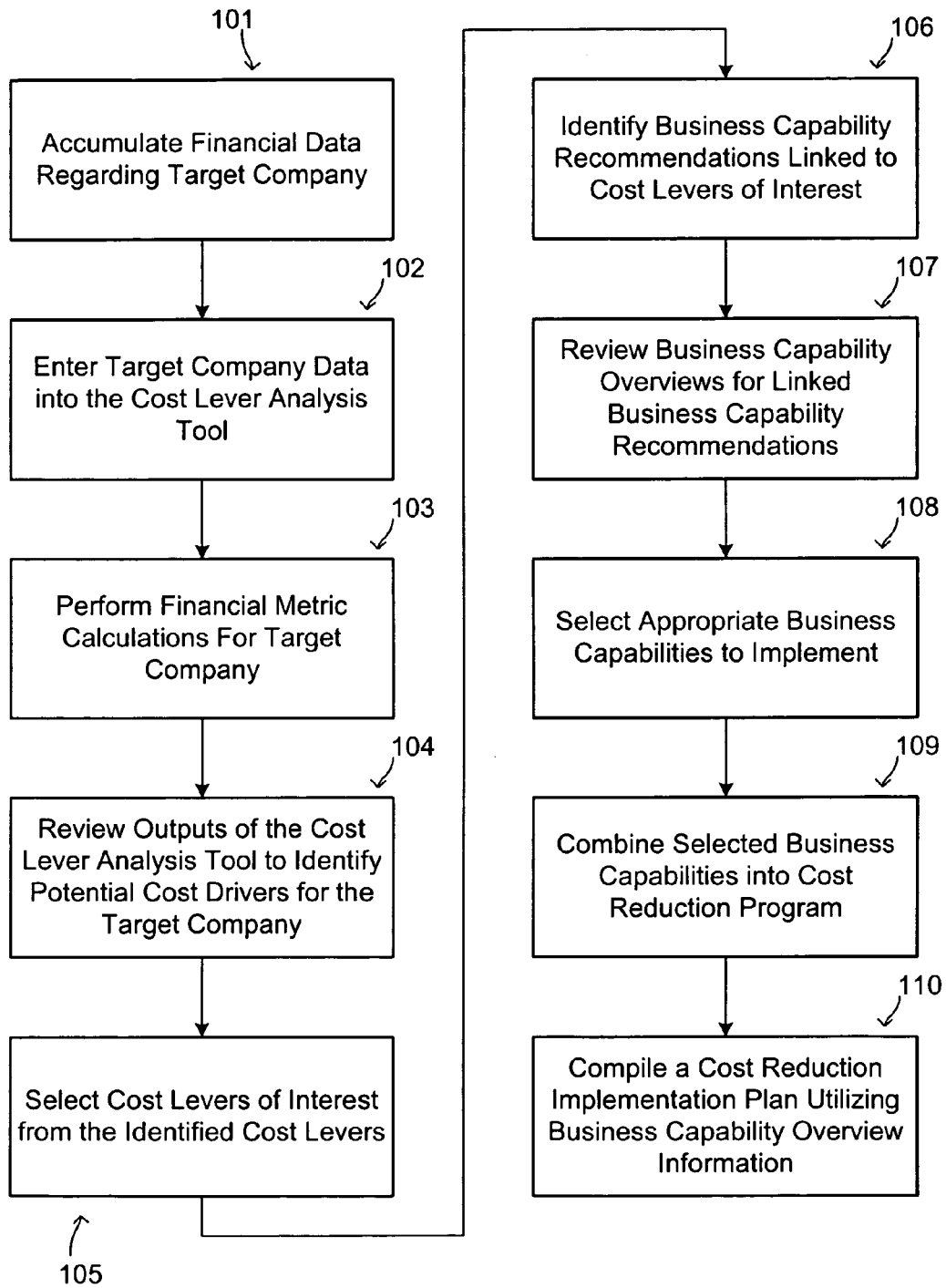
FIG. 1 is a flow diagram illustrating a cost lever analysis and cost reduction strategy method according to embodiments of the invention.

Systems according to the present invention comprise modules, tools, applications and computing programs adapted to perform various cost lever analysis and cost reduction strategy selection functionalities. As depicted in the flow diagram of FIG. 1, one cost lever analysis and cost reduction strategy selection method 100 performed by the systems according to embodiments of the invention is initiated by the user accumulating financial data regarding the target company at step 101, and then entering that target company data into a cost lever analysis tool according to the invention at step 102. This cost lever analysis tool is adapted to automatically examine the target company's financial data and detect the key cost levers that affect the company's cost structure and profitability. As described in further detail below, this financial data utilized by the tool could be of a variety of types obtained from a variety of sources, and can be entered into the cost lever analysis tool in a variety of methods (e.g., manually or automatically).

The cost lever analysis tool thereafter performs various financial calculations based upon the inputted financial data and produces normalized and/or base-lined financial metrics, diagnostic ratios, reports and the like that focus on the cost structure, drivers and levers of the target company at step 103. These financial metrics related outputs from the cost lever analysis tool are then reviewed by the user to identify cost levers for the company that then could be targeted with cost reduction initiatives, step 104.

For example, the reports outputted by the cost lever analysis tool for a given target company could show that the target company had reported growth in their cost of goods sold substantially greater than that experienced by their more successful competitors. This particular result would then be seen as a red flag informing the user to investigate further in this area, such as by reviewing further metrics, diagnostics and data relating to various components of costs of goods sold, such as labor costs, procurement costs, direct material costs, freight costs and the like.

In preferred embodiments of the invention, the outputs of the cost lever analysis tool include reports that detail various metrics and diagnostic ratios in an organized manner. These metrics and diagnostic ratios can include, for example, profitability ratios (such as return on invested capital, gross profit margin, operating margin, and revenue growth), management effectiveness ratios (such as return on equity and return on assets), expense ratios (such as cost of goods sold, sales, general and administrative expenditures, depreciation and amortization, advertising costs, research and development expenditures, and miscellaneous operating expenditures), and efficiency ratios (such as receivables days outstanding, net sales to inventory, inventory turnover, payables period, employee efficiency, operating income per asset, and general efficiency ratios). The outputted reports can include various charts, graphs, comparisons and the like as may assist in presenting the derived metrics and ratios in a meaningful way (such as in, for example, the graph depicted in FIG. 6 and described below). Optionally, the user at step 104 can review the various outputs of the cost lever analysis tool in light of external information regarding the target company, including analyst reports, client and client team research, benchmarking studies, and historic industry standards. Upon reviewing the outputs and identifying basic problematic cost lever centers, such as cost of goods sold, sales, general, and administrative expenditures, etc., the user can drill down the particular common cost drivers of the problematic cost centers to identify particular cost levers of interest. For example, upon identifying that the target company's sales, general, and administrative ("SG&A") expenditures are out of line with industry norms, the user knows to consider further any metrics, diagnostic ratios or reports that reflect the cost drivers that negatively impact SG&A. Such cost drivers could include functional costs issues, such as relating to human resources, information technology, finance, corporate, sales, and marketing, and cross enterprise costs issues, such as relating to administrative overhead, training, and program management. In our example relating to cost problems stemming from SG&A, further analysis could, for example, inform the user that poor performance by the target company is reflected in employee efficiency, labor expense as a percentage of sales, and efficiency ratio (such as could stem from increasing costs relating to difficulties in retaining quality staff and retooling costs for obtaining and training replacement staff). In this manner, a universe of potential cost levers associated with the identified cost drivers could thereby be identified.

Upon reviewing the outputs from the cost lever analysis tool and identifying potential levers at step 104, the user is now able to begin using a cost reduction strategy tool according to the invention at step 105 to select cost levers of interest to the target company from the levers identified at step 104. This cost reduction strategy tool is adapted to link various cost levers to pertinent business capability recommendations that can provide a positive impact on the levers, and is adapted to then provide business capability overviews containing case studies, implementation plans, integration implications, sample benefit and impact forecasts and other relevant information pertaining to the understanding, assessment and implementation of a particular business capability recommendation. As described in further detail below, the linked recommendations and overviews for particular levers help the user obtain useful information that provides guidance regarding the selection and implementation of effective cost reduction strategies.

At step 105, the user begins to explore and select one or more problematic cost levers of interest that have some applicability to one or more cost centers/drivers of the target company. Continuing with the example from above, this could entail deciding that retooling costs for replacement staff is a more significant or viable lever than retention of quality staff for the target company because cost reduction efforts aimed at reducing retooling costs might provide more immediate and cost effective impact. Thereafter, at step 106, the user accesses the cost reduction strategy tool to identify and explore various business capability recommendations linked to each selected lever. For example, to address the lever of the target company's retooling cost structure through reduction of training costs, one such business capability recommendation linked to that lever could be the implementation of outsourced training programs, and a second could relate to purchase and use of electronic training and learning systems for new and existing employees. In embodiments of the invention, each business capability recommendation linked to a particular lever by the cost reduction strategy tool is known to work effectively to reduce costs under given circumstances through the linked cost lever. These linked business capability recommendations include both traditional fast-acting cost reduction strategies as well as restructuring-based strategies, such as high value electronically enabled business capabilities that can fundamentally change the target company's cost structure.

Further, for each business capability recommendation, the cost reduction strategy tool provides the user with access to business capability overviews. At step 107, the user reviews the appropriate business capability overviews through the cost reduction strategy tool to obtain information to determine whether particular business capabilities would serve as a suitable cost reduction strategy for the target company. The overviews are maintained with descriptions regarding the leading or emerging best practices related to the capability, descriptions regarding typical financial benefits delivered by adoption of the recommendation (impact over one or more time frames on cost of goods sold, SG&A, etc.), notations of integration concerns, and identification of considerations regarding implementation and necessary capital investment. After reviewing the information repository relating to the business capabilities, the user is thereby able to make a simplified and informed decision at step 108 selecting those business capabilities that will be implemented as part of an overall cost reduction strategy for the target company. These business capabilities are thereafter combined into a cost reduction program at step 109, and using the information from the business capability overviews, the user can be assisted in preparing an implementation plan for the cost reduction program at step 110.

Figure 2:
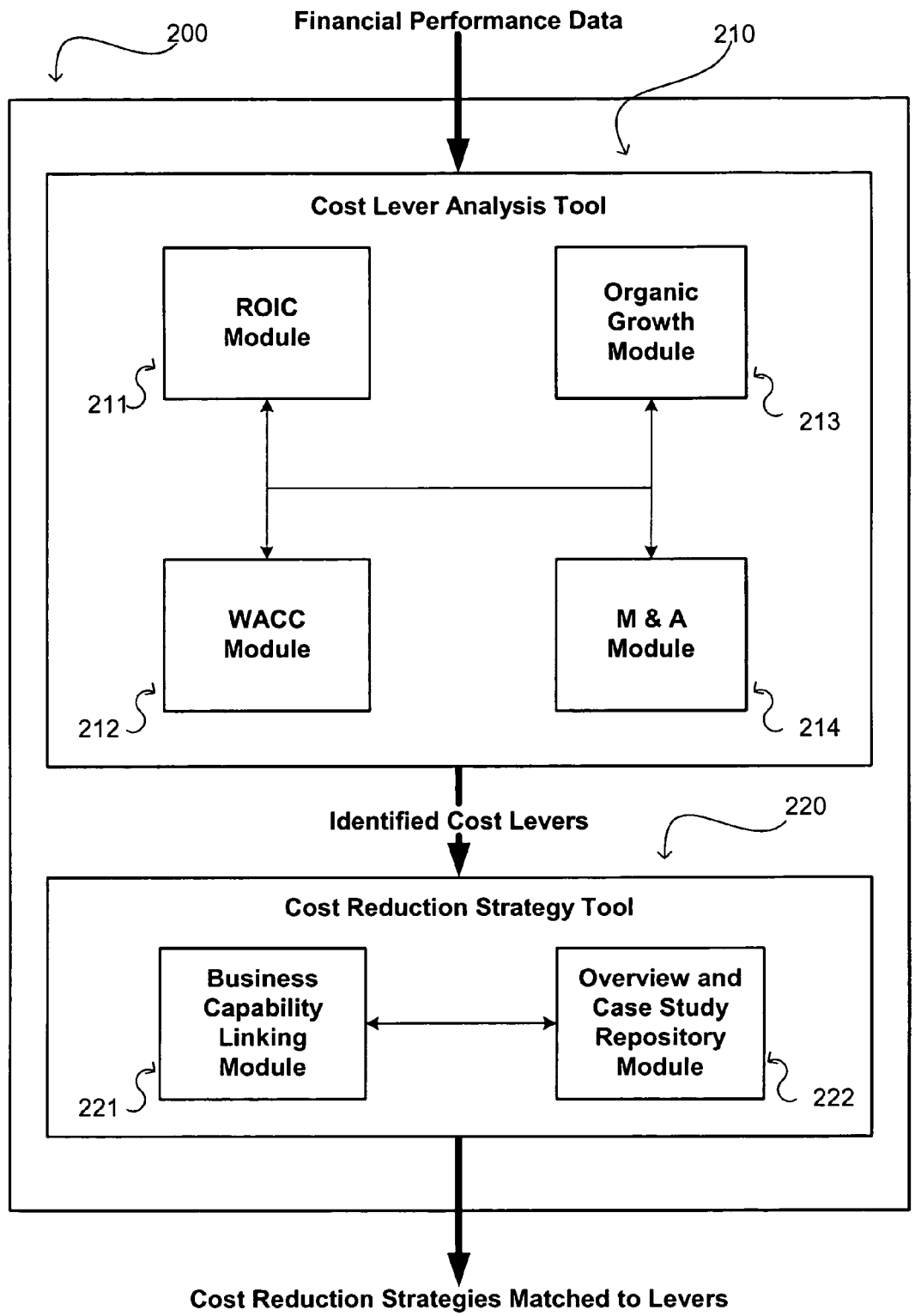
FIG. 2 is a schematic diagram depicting an electronic system for operation of a cost lever analysis tool and a cost reduction strategy tool in accordance with embodiments of the present invention.

The general functional operation of the invention having been thus described, FIG. 2 schematically illustrates a system 100 for cost lever analysis and cost reduction strategy selection in accordance with embodiments of the present invention. As depicted in FIG. 2, the system 200 may include various software-driven applications that include modules that automatically perform various steps of related cost lever identification and strategy selection functionalities of the present invention, as generally described above with respect to FIG. 1 and as will be further described in detail below. Specifically, the system 200 may include two software driven tools that operate in electronic communication, a cost lever analysis tool 210 and a cost reduction strategy tool 220.

In embodiments of the present invention as depicted in FIG. 2, this cost lever analysis tool 210 utilizes various types of financial performance data as inputs. This financial performance data can include known financial and stock price data (which may be publicly available or obtained through non-public sources) for the target company, and can optionally include like data for selected other companies for sake of comparison. As described herein, the tool 210 can also optionally take as an input various decisions or assumptions made in advance concerning appropriate cost-reduction strategies and proposals (such as, for example, utilizing rules to filter out invalid or already undertaken recommendations, outlier data, or recommendations the implementation of which would exceed established budgetary or logistical constraints). The cost lever analysis tool 210 thereafter performs an analysis of the performance of the target company with respect to the other companies in terms of shareholder value as it is broken down and described by the relative strength and weaknesses of various performance metrics for the target company (as compared to any selected other companies, to baselines, or to industry norms). As depicted in FIG. 2, the cost lever analysis tool 210 contains an ROIC ("return on invested capital") module 211, a WACC ("weighted average cost of capital") module 212, an organic growth module 213, and an M&A module 214 that are all in electronic communication with one another. The modules 211-214 operate in concert to deconstruct the various elements that make up shareholder value and associated costs. The cost lever analysis tool 210 thereafter outputs various metrics, ratios, reports and comparison charts that illustrate to the user the performance of the target company with respect to the market and its peers/competitors. These performance comparisons thereby enable one to identify suitable areas for targeting with cost reduction efforts. In this manner, and as will be shown in more detail within FIG. 3 and FIG. 4, the key cost levers for a given company can thereafter be identified.

As will be understood by one skilled in the art, modules 211, 212, 213, and 214 of cost lever analysis tool 210 comprise the processes, applications and routines that are utilized for calculating metrics and data regarding the ROIC, WACC, Organic Growth, and Growth through M&A, respectively. In a basic implementation, for example, the cost lever analysis tool 210 can comprise a spreadsheet or similar application that is adapted to receive various financial data streams and user inputted data in designated locations, and then use these inputs to calculate spread, growth, and other metrics and ratios utilized to review the various elements of total cost in a company, thereby identifying cost levers for targeting with cost reduction strategies.

Again, as shown in FIG. 2, these identified cost levers are thereafter used as an input to the cost reduction strategy tool 220. The cost reduction strategy tool includes a capability-linking module 221 and an overview and case study repository module 222, both in electronic intercommunication as shown. Taking the various outputs of the cost lever analysis tool 210 as inputs, the cost reduction strategy tool 220 provides suggested cost reduction strategies suitable for the identified cost reduction opportunity areas in the form of various business capability recommendations. Each of the business capability recommendations are linked by module 221 to one or more capability overviews maintained in repository module 222. The capability overviews are associated with the leading and/or emerging best practices in one or more industries with respect to that capability, and the overviews preferably include case studies that focus on the financial benefits achieved by particular business capabilities in certain circumstances and include results analyses in those cases providing benchmarking via certain financial metrics, including, for example, cost of goods sold (known commonly as "COGS"), sales, general and administrative expenditures (known commonly as "SG&A"), and capital invested to support the capability. In this manner, appropriate cost reduction strategies for a target company can be identified and explored.

Cost-reducing strategies, for example, can include customer self-service extranet installations to give selected customers access to electronic information including order status and payment data. Similarly, another strategy can recommend the implementation of an employee Internet or intranet portal to permit employees to get information about their benefits and other company data, and an additional other strategy can recommend the implementation of on-line catalog capabilities for use in internal procurement functions of the organization. In particular, electronic procurement capabilities can provide optimized and centralized procurement processes by reducing the number of suppliers, developing a strategic sourcing capability, and, for example, enabling the joining of new industry electronic market places. Electronic customer service centers can allow dynamic configuration and pricing quoting for customers, advanced order management functions, and other features of customer self-service.

Figure 3:
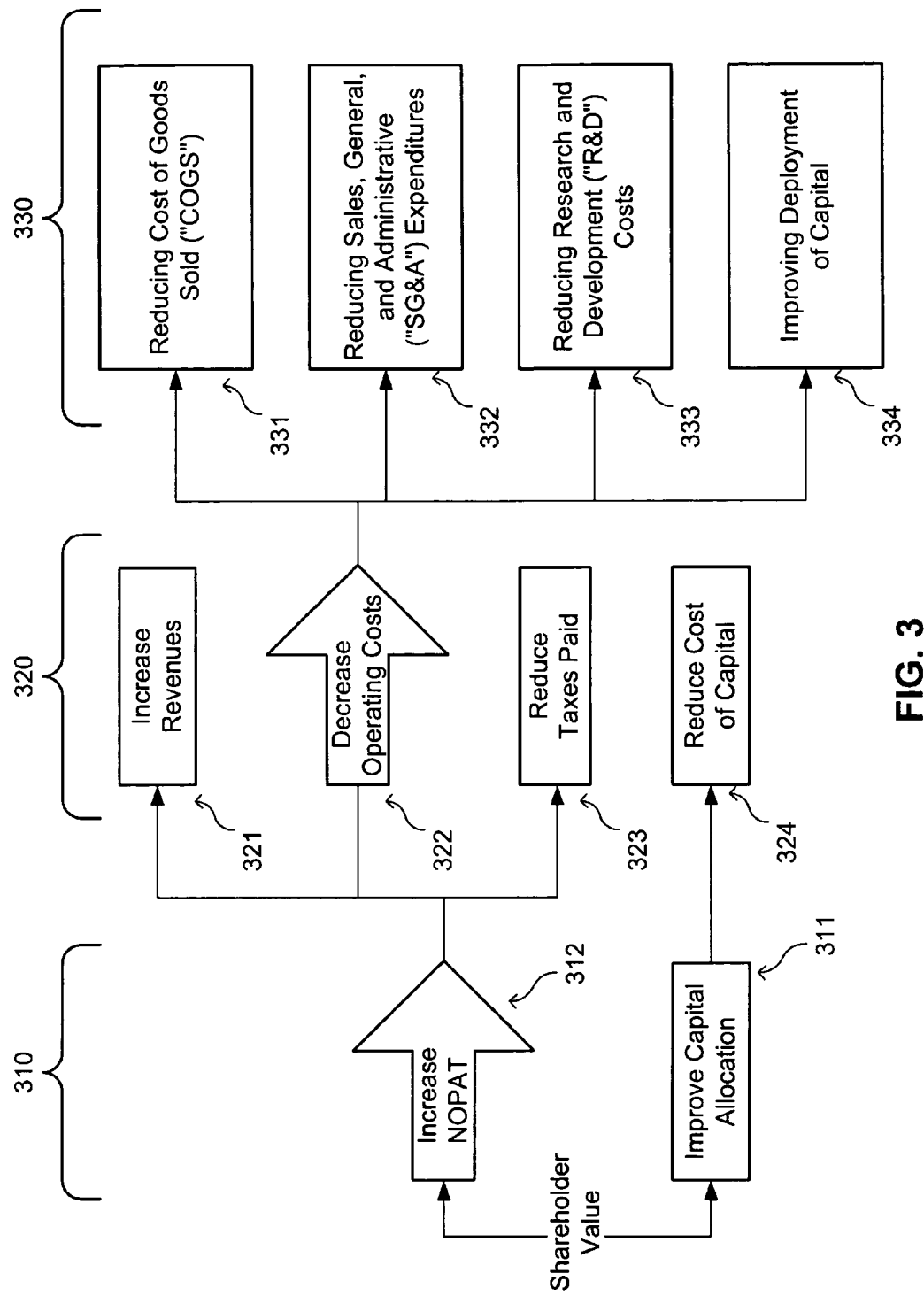
FIG. 3 is a logical diagram depicting how the components of shareholder value are broken down to identify cost lever centers and related cost levers by the cost lever analysis tool in accordance with embodiments of the present invention.
Figure 4:
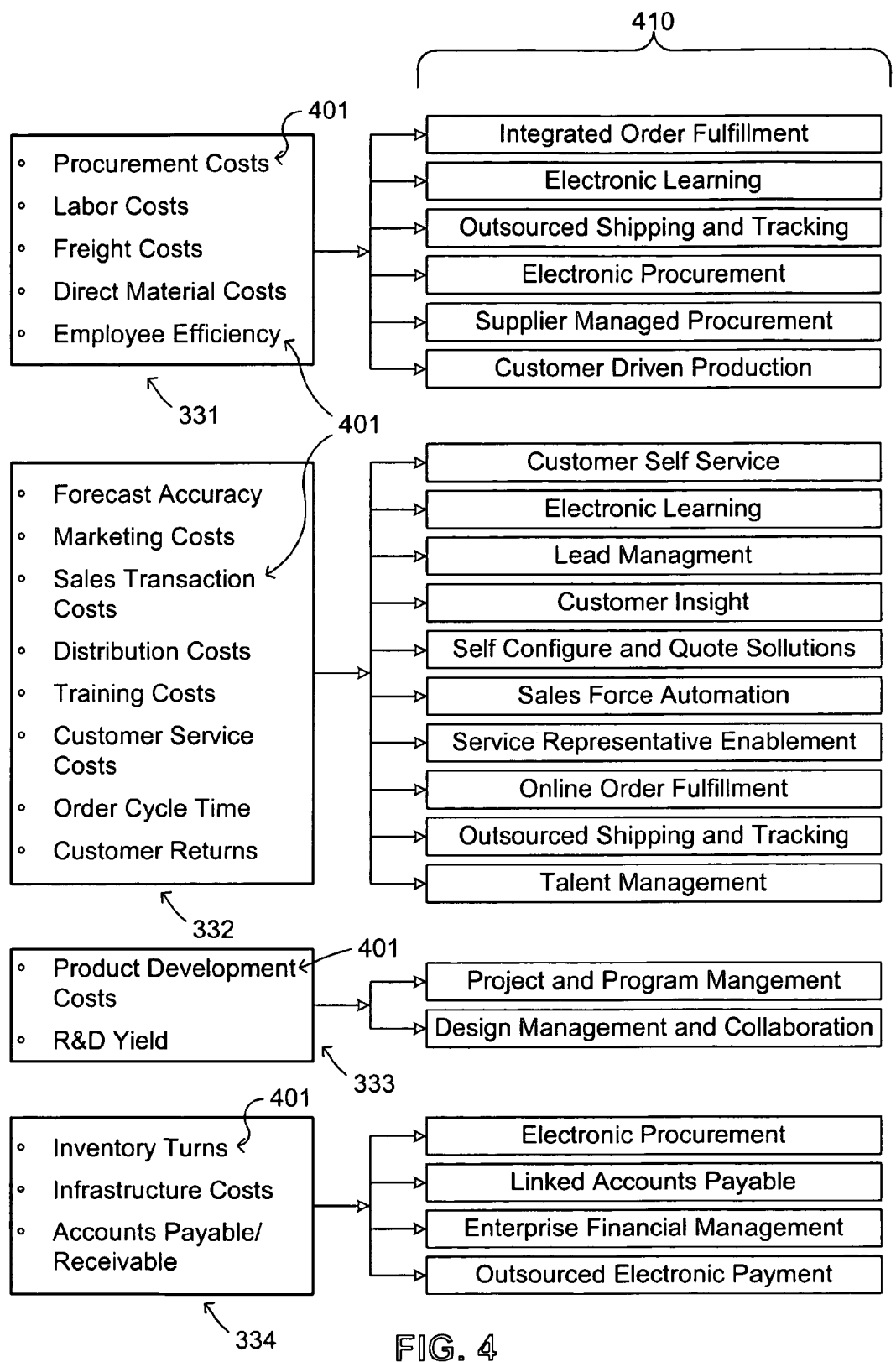
FIG. 4 is a logical diagram depicting how the cost levers are linked to business capability recommendations adapted to address particular cost levers of interest by the cost lever analysis tool in accordance with embodiments of the present invention.

The logical operation of the cost lever analysis tool 210 is illustrated schematically by FIG. 3, with the related logical operation of the cost reduction strategy tool 220 being likewise illustrated schematically in FIG. 4. As shown in FIG. 3, the major cost component measures of shareholder value can be conceptually broken down into various sub components. At a first level of depth 310, shareholder value can be improved by improving the capital allocation of invested capital 311, or by increasing the net operating profit after tax ("NOPAT") 312. The manners whereby NOPAT can be increased are further broken down by FIG. 3 at the next level of depth 320 to include the alternative paths of: increasing revenues 321, reducing taxes paid 323, and decreasing operating costs 322. Therefore, as shown in FIG. 3, one pathway for increasing shareholder value is by increasing NOPAT through decreased operating costs. Likewise, improving capital allocation 311 can be further broken down at level 320 into its subcomponent of reducing the cost of capital 324. (FIG. 3 further breaks down the pathway through decreasing operating costs 322 only for sake of simplicity.)

As depicted in FIG. 3, the decreasing of operating costs 322 can be further broken down conceptually at level of depth 330 as including the alternative cost lever centers relating to reducing the COGS 331, reducing SG&A expenditures 332, reducing R&D costs 333, and improving the deployment of capital 334. Each of the cost lever centers 331 through 334 for decreasing operating costs in turn can be related to one or more cost levers. Certain ones of these cost levers are itemized in FIG. 4.

Turning now to FIG. 4, there is depicted the cost lever centers 331 through 334 (as previously depicted in FIG. 3), and within each cost lever center are shown various related cost levers 401. By way of illustration, a cost lever relating to "Training Costs" is located within the cost lever center 332 for reducing SG&A expenditures. As shown in FIG. 4, the levers 401 within each cost lever center are linked with various business capability recommendations 410. Preferably, there is at least one business capability recommendation 410 associated with each cost lever 401, but more than one lever 401 can be associated with a given recommendation 410. For example, as depicted, a business capability recommendation relating to "Outsourced Shipping and Tracking" is associated with cost levers associated with reducing the COGS and reducing SG&A expenditures, meaning that such a recommendation might be particularly attractive to a target company that is performing poorly in both areas.

Figure 5:
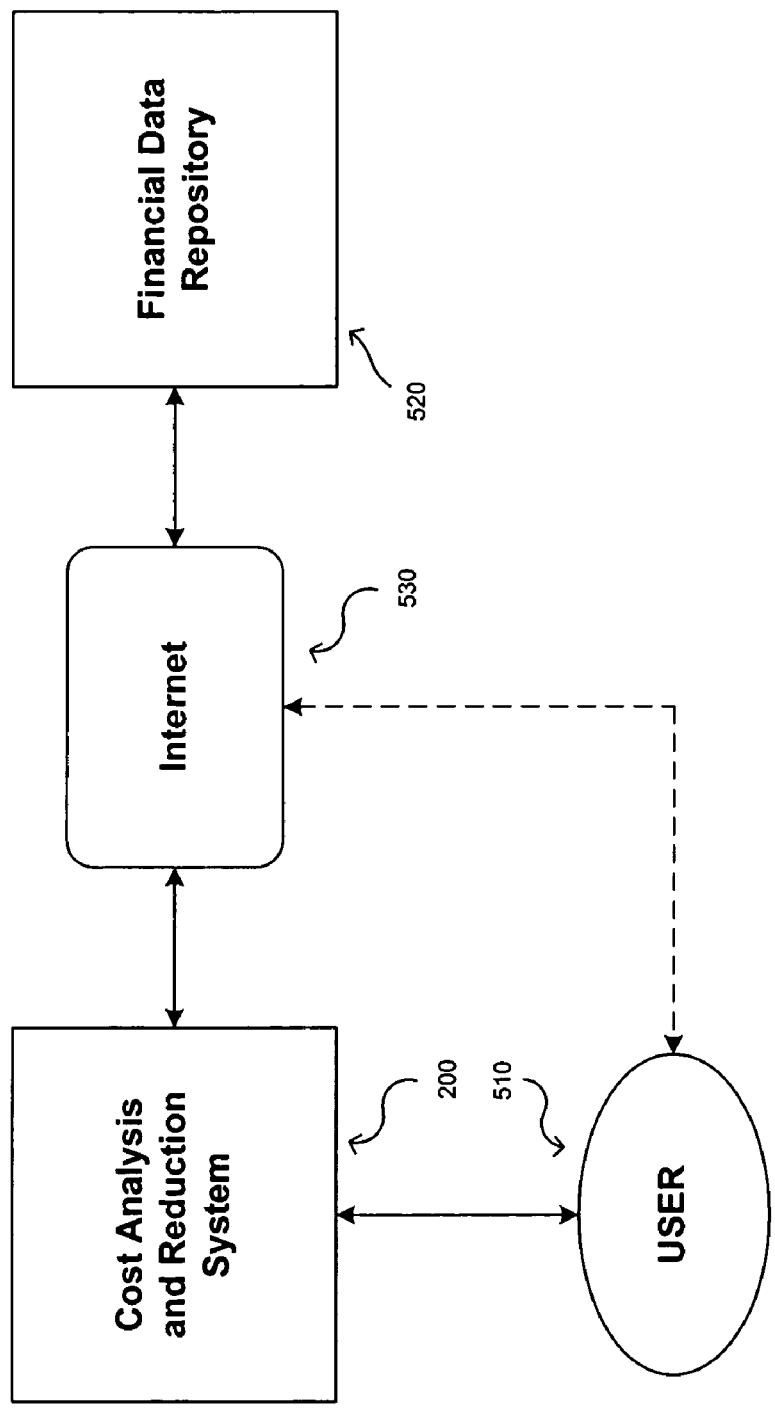
FIG. 5 is a schematic diagram depicting the operation of the system of FIG. 1 within a larger environment including external networked electronic data sources in accordance with embodiments of the present invention.

In certain embodiments of the invention as depicted in additional detail in FIG. 5, the system 200, and thus cost lever analysis tool 210, can be connected to a financial data repository 520 via a distributed network, such as the Internet 530. A user 510 could access the system 200 either directly, as shown in the solid communication line, or alternatively, as shown with the broken line communication line, could access the system 200 from a remote computer over the Internet 530. The financial data repository 520, as described above, may, for example, be the EDGAR website administered by the United States Security and Exchange Committee, commercial services like Standard and Poor's Compustat database (available at www.Compustat.com) or Thomson Financial's Global Access database (available at www.Primark.com), or other publicly accessible source of financial data. In this embodiment, the cost lever analysis tool 210 and cost reduction strategy tool 220 could comprise applications present on an Internet accessible server and made available in controlled fashion to various users and applications via the distributed network through a standard web browser driven interface. Additionally, the cost lever analysis tool 210 could be adapted to accept various inputs from the user 510 as described herein to use with the information obtained from the financial data repository 520. For instance, the cost lever analysis tool 210 may interface with other software applications made available by the system 200, such as data mining applications (not depicted) that utilize Extended Meta Language to automatically search for and return relevant information from the financial data repository 520.

Figure 6:
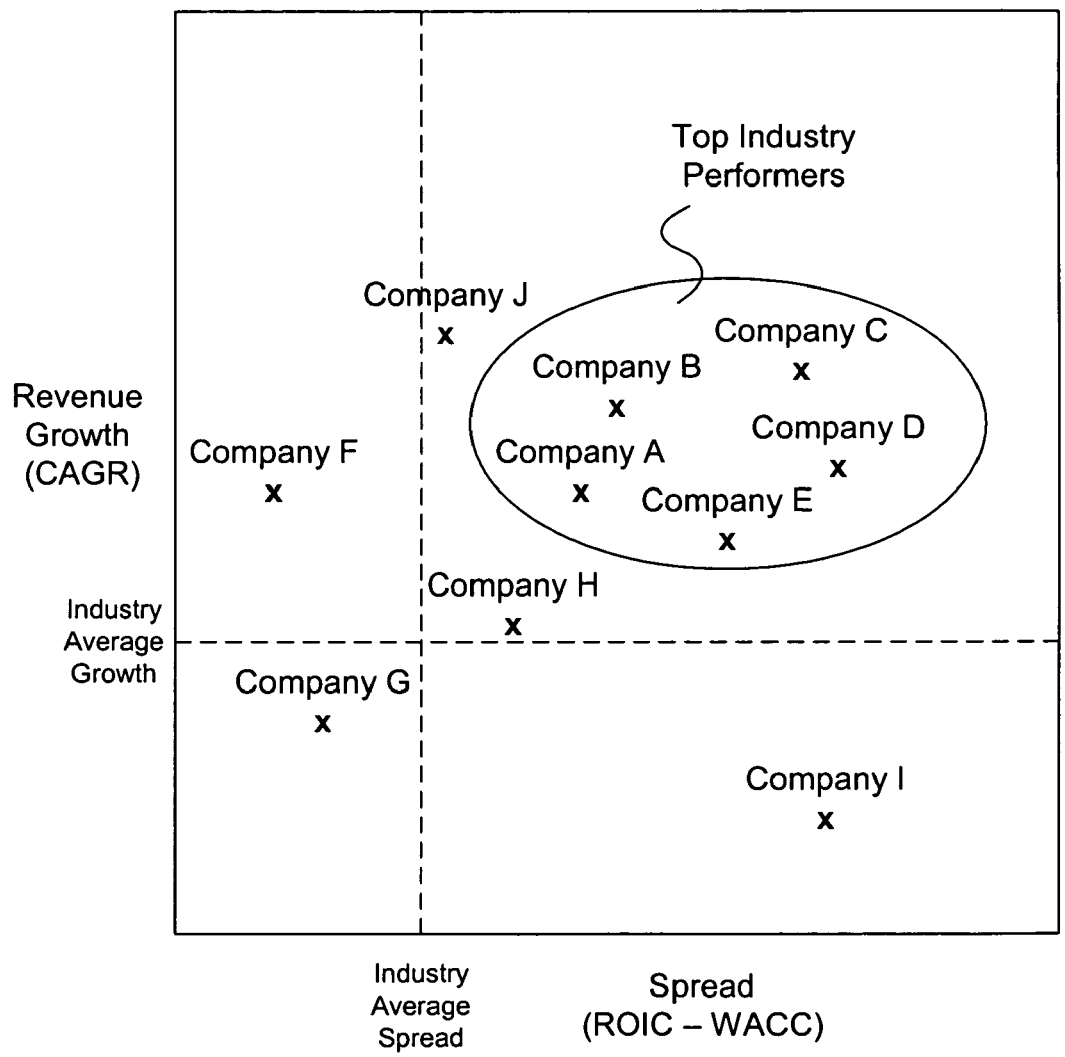
FIG. 6 depicts an exemplary output graph summarizing the findings of a cost lever assessment as may be performed by the system of FIG. 1.

As described above, the cost lever analysis tool 210 may optionally visually display results in a variety of formats, such as, for example, various reports and graphs. One such graph is the sample Shareholder Return Graph 600 as depicted in FIG. 6. This particular type of graph 600 compares growth (as represented by the Compound Annual Growth Rate ("CAGR")) and the spread (as measured by the difference of the return to investors and the weighted cost of capital). Generally speaking, companies having above average growth and spread have higher rates of return. Thus, the Shareholder Return Graph 600 identifies certain companies as top industry performers and others as underperformers. Users can use various different graphs and reports as produced by the cost lever analysis tool in order to assist in identifying key cost levers.

Figure 7:
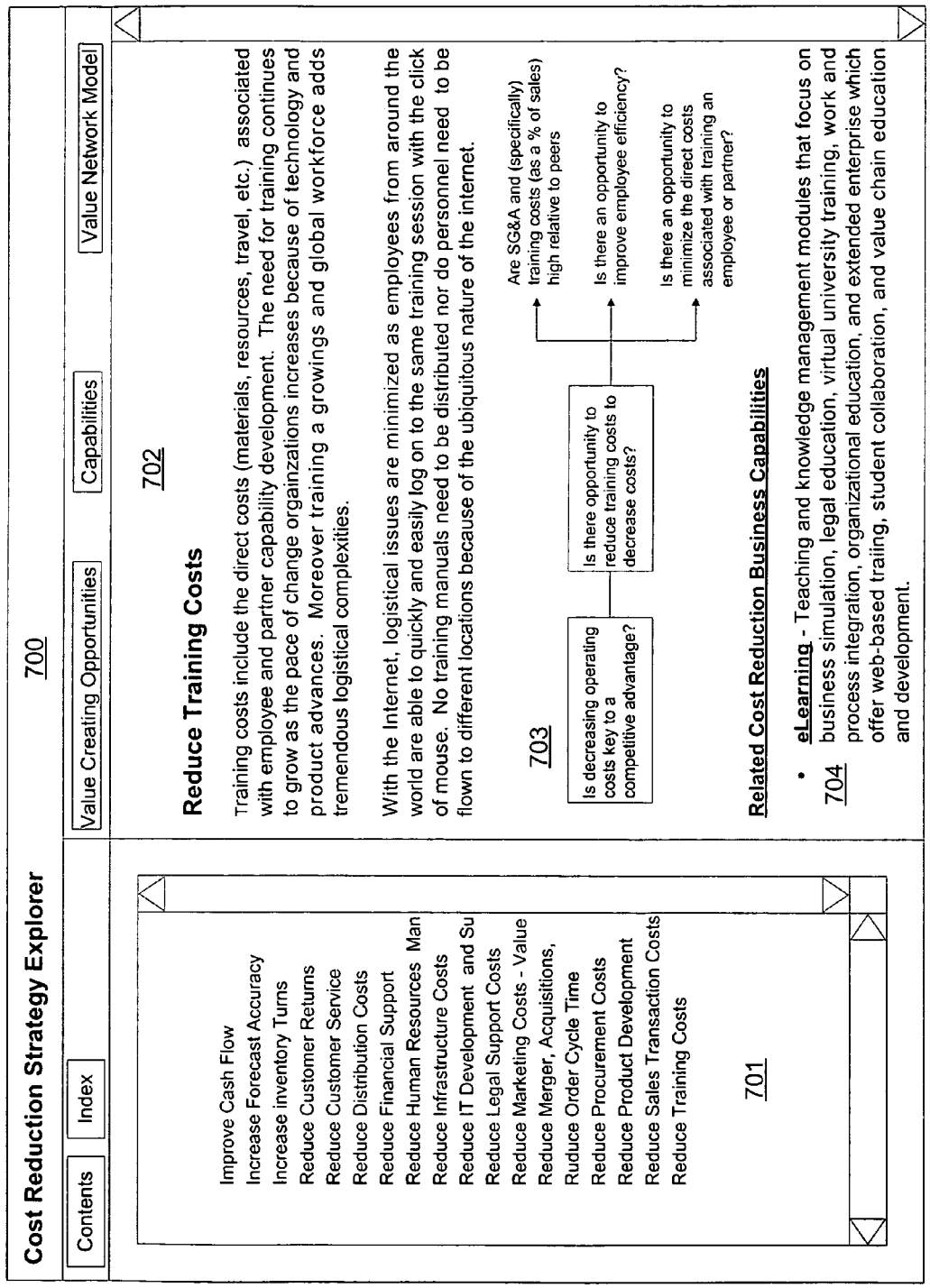

Referring now to FIG. 7, there is depicted a sample user view 700 from a cost reduction strategy tool according to embodiments of the present invention. The user view 700 is an example of a suitable user view for allowing a user to identify business capability recommendations linked to cost levers of interest. As shown in user view 700, the user is provided with a list of cost lever links 701 along the left side of the screen ("Improve Cash Flow . . . ", "Increase Forecast Accuracy . . . ", "Reduce Training Costs . . . ", etc.) that the user can select, with each link relating to a different cost lever. Selection of a particular cost lever link 701 causes the display along the right side of user view 700 of background information 702 concerning the appropriate cost lever, and a name 703 and, optionally, a short summary 704 regarding each business capability recommendation linked by the cost reduction strategy tool to the appropriate cost lever (additional listings and short summaries for additional linked business capability recommendations being available by scrolling down as is known in the art). In the user view 700 depicted in FIG. 7, the cost lever link "Reduce Training Costs" has been selected by the user, causing the display of background information 702, and business capability recommendation names 703 (such as "eLearning"). Optionally, as depicted, introductory information is also provided in this user view for each recommendation that can operate on the target company through the cost lever "Reduce Training Costs." Employing user view 700 to interact with the cost reduction strategy tool, a user can thereby identify and explore any of the various business capability recommendations associated with cost levers of interest.

FIG. 8 depicts a user view 800 from the cost reduction strategy tool that may be used to allow the user to review the business capability overviews for a particular business capability recommendation. A user could reach user view 800, for example, by selecting a link in user view 700 pertaining to a particular business capability recommendation of interest (such as via a hyperlinked name 703 for a chosen one of the business capability recommendations in user view 700), or by navigating directly to desired overview by selecting the business capability recommendation from one or more lists. As shown in FIG. 8, an overview 801 can be provided in a window on one side of the display, and could appear as, for example, a document containing various sections and having hyperlinks embedded within the document for viewing additional related information. The recommendation overview 800 displayed in user view 800 has a table of contents 802 identifying various sections of the document and which can provide a mechanism for jumping directly to a particular section within the overview document. Sections of an overview document can include, for example, a Definition of the recommendation, an Introduction, a discussion of Leading Practices, a description of Financial Benefits (preferably broken down to describe the impact upon key metrics or business parameters, such as by identifying potential benefits to COGS, SG&A, and Capital Deployed), Sample Benefits, Implementation Considerations, Business Integration Implications (such as relating to processes, personnel changes, and technology), Case Studies, Representative Solution Providers, Value Creating Opportunities, Value Network Relationships, Related Sub-processes, Related Cost Reduction Capabilities, and Research Footnotes. A user can thereby scroll down and review relevant portions of the overview document and access various case studies and other relevant information to determine whether a given business capability recommendation is appropriate for the target company.

FIG. 9 is an illustration of the layout of a sample cost reduction strategy implementation plan template 900 that can be produced by the cost reduction strategy tool according to embodiments of the present invention. Implementation plan template 900 provides sections 901-905 summarizing expected economic impacts (901), summarizing the selected strategy (902), identifying an expected implementation schedule and plan (903), projecting cost considerations (904), and projecting key benefits (905). Optionally, according to the present invention, a template implementation plan 900 can be automatically produced by the cost reduction strategy tool upon the user selecting a business capability of interest for implementation and combination into a cost reduction plan. This template can be generated with default or suggested values for the implementation timelines, cost and benefit projections and the like, which may then be later reviewed and revised by the user in light of the overview (and overviews for other selected business capabilities) and customized as appropriate. In this manner, the user is able to leverage the information stored in the repository of the cost reduction strategy tool most easily while compiling a finalized cost reduction plan.

The present invention now having been described in detail to one of ordinary skill in the art, description will now be provided with respect to the functional operation of a cost lever analysis tool according to one particular preferred embodiments of the invention.

Figure 10:
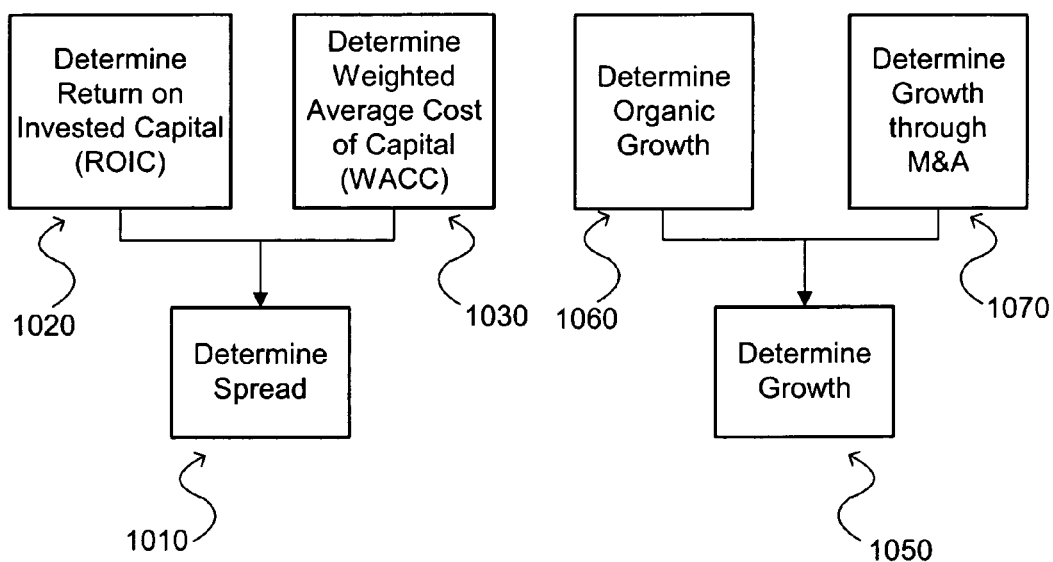
FIG. 10, FIG. 11 and FIG. 12 are logic diagrams depicting how various cost metrics and diagnostic ratios can be calculated and utilized to identify value and cost drivers and levers.

As depicted in FIG. 10, the cost lever analysis tool of the present invention performs a cost reduction analysis according to preset logic 1000 to automatically evaluate various factors contributing to a particular company's cost structure. The identification of cost levers, as will appreciated by those skilled in the art, turns on an analysis of the total return to shareholders ("TRS") and the various cost and revenue components of TRS. TRS has various components, and there are various mechanisms for assessing those components. Logic 1000 according to the present invention, however, analyzes TRS by analyzing the metrics known as spread and growth. As shown in FIG. 10, spread 1010 and growth 1050 can be determined in parallel, with the determination of spread 1010 requiring the determination of sub components 1020 and 1030, and the determination of growth 1050 requiring the determination of sub components 1060 and 1070. These various component and sub component determinations are described in greater detail below.

The various calculations taken into account by logic 1000 and the various methods according to the present invention typically use, for example, the information found in a company's financial statement as an input. Such financial statements generally consist of a balance sheet, income statement, cash flow statement, and notes to the financial statements.

As indicated above, the cost lever analysis logic 1000 of FIG. 1000 includes the steps of calculating spread 1010 and the calculation of growth 1050. The calculation of spread 1010 addresses value through the business operations of the company where the calculation of growth 1050 address changes in the value of the company through changes in its size and structure. The combination of both spread and growth can thereby be used to gauge the relative health and vitality of a given company and its various operations and subunits.

Referring to FIG. 10, it is shown that the determination of spread 350 requires the calculation of a return on invested capital ("ROIC") 1020 and a weighted average cost of capital ("WACC") 1030. The ROIC value captures the return on the investment provided by the company's investors (debt and equity investors). ROIC is defined in Equation 3 ("Eq. 3") below:

$$ROIC = NOPLAT/\text{Invested Capital} \quad (\text{Eq. 3})$$

In Equation 3, Invested Capital represents capital provided by debt and equity investors. Invested capital is money invested to derive a company's operating profits. Continuing with Equation 3, net operating profit less adjusted taxes ("NOPLAT") is the total operating profits for a business with adjustments made for taxes. Thus, NOPLAT measures the total cash available for distribution to financial capital contributors.

The company's invested capital is needed to determine ROIC 1020 using Equation 3. In theory, debt and equity investors are the only group that demands a return from the company's operations. The debt investor invests capital as reflected by the amount of a note. The amount owed to debt investors is reflected on a company's balance sheet at the current maturities of long-term debt, long-term debt, and capitalized leases. The debt investor has an expected return of interest on the outstanding obligation of the company. An equity investor may provide an initial investment that appears on a company's balance sheet as common stock, additional paid-in-capital, or as preferred stock. Conversely, equity investor may provide earnings from the initial investment may be reinvested in operations and these reinvested earnings appear on a company's balance sheet as retained earnings. In exchange for the initial investment and the reinvested earnings, the equity investor expects to receive capital appreciation plus dividends.

Invested capital (abbreviated "I-CAP") may be determined using Equation 4A or 4B:

$$I\text{-}CAP \approx \text{Working Capital} + \text{Fixed Assets} \quad (\text{Eq. 4A}),$$

or $$I\text{-}CAP \approx \text{Debt} + \text{Equity} \quad (\text{Eq. 4B})$$

where working capital equals current assets minus current liabilities.

The calculation of invested capital preferably includes the consideration of quasi-debt and quasi-equity. The term quasi-debt is used herein to refer to money that a company has borrowed to fund retirement-related liabilities, and the quasi-debt effects investors' interests because of the negative future returns associated with the cost of the debt. The quasi-debt is generally included in "other long-term liabilities" or another similar entry in a company's balance sheet. The term quasi-equity, as used herein, refers to deferred income taxes. The quasi-equity should be included in the calculation of invested capital because it may produce a return to shareholders in the form of capital.

To calculate invested capital using either Equations 4A or 4B, the company's balance sheet may be organized to see how much capital is invested in the company by equity and debt investors and how much of the capital has been invested in operating activities and other non-operating activities. Invested capital may then be calculated in two ways—either identifying where the capital is invested (essentially Working Capital+Fixed Assets) or identifying the sources for the capital (essentially Equity+Debt+other).

More specifically, the identifying of where the capital is invested begins by determining net operating working capital. The determining of net operating working capital in generally includes calculating the difference between operating current assets and operating current liabilities. The operating working capital is added to (1) net property, plant and equipment and (2) other assets net of other liabilities to calculate operating invested capital. Then, the operating invested capital may be summed together with goodwill and cumulative goodwill written off (which is typically not available from publicly available data) to calculate operating invested capital after goodwill. The operating invested capital after goodwill is then added to excess marketable securities and non-operating assets to calculate total investor funds.

Alternatively, invested capital may be calculated by identifying the sources for the capital. Specifically, adjusted equity is calculated by adding equity, cumulative written off goodwill and deferred income taxes (i.e., quasi assets). The adjusted equity is then summed with debt and retirement related liabilities (i.e., quasi debt) to calculate total investor funds. It should be appreciated that the amount of invested capital determined through either identifying of where the capital is invested identifying the sources for the capital should be the same.

Referring back to Equation 3, the next component needed to determine the ROIC 1020 is a calculation of the target company's NOPLAT. As described above, NOPLAT represents the residual return earned by the debt and equity holders after other stakeholders are paid in the operation of the business. Generally, NOPLAT may be calculated using Equation 5, $$NOPLAT = EBITA - \text{Cash Taxes} \quad (\text{Eq. 5})$$

where EBITA stands for "Earnings Before Interest, Taxes, and Amortization." EBITA is typically calculated by looking to the company's revenue, adjusted for the cost of goods/services (such as wages and material costs associated with producing the good/service and any depression) and other expenses including selling, general, and administrative costs (such as other wages, commissions, fees).

Continuing with Equation 5, the next task in calculating NOPLAT is to calculate the cash taxes paid on the EBITA. Generally, the cash taxes are calculated using GAAP income taxes adjusted for reverse deferred taxes. The reverse deferred taxes represents tax liabilities that are recognized for accounting purposes, but not for tax purposes. The cash taxes may be further adjusted for any lost interest expense deduction to determine the cash taxes on the EBITA.

After determining EBITA and Cash Taxes on the EBITA, NOPLAT may then be calculated by subtracting the cash taxes on EBITA from EBITA.

As with invented capital, NOPLAT may be determined in two ways, either adjusting from revenues ("top down") or adding back to net income ("bottom up"). Either method may be used or both may be done to ensure that the calculations of NOPLAT are performed correctly. Thus, in the top down method, $$NOPLAT = \text{Reported } EBITA \quad (\text{Eq. 6})$$
$$- \text{Taxes on } EBITA$$
$$+ \text{Increase in Deferred Taxes}$$

where the reported EBITA is the total revenues adjusted for the Cost of goods sold, selling, general and administration expenses, depreciation expense, and other operating expenses. In the top down method, a company's Net Income is summed with any increase in deferred taxes, goodwill amortization, any extraordinary accounting items (also called special items after taxes or after tax items) and minority interest income to calculate an Adjusted Net Income for that company. Then, the Adjusted Net Income is summed with any interest expenses after tax to determine the company's Total Income Available to Investors. NOPLAT may then be calculated by subtracting Interest income after-tax and Non-operating income after-tax from the Total Income Available to Investors.

After calculating NOPLAT and Invested Capital, the ROIC may be calculated as the ratio of NOPLAT to Invested Capital, as provided above in Equation 3. Thus, using the methods described above for calculating NOPLAT, a company's ROIC for a time period of interest may be calculated using the invested capital at the end of that period or by using the average invested capital during that period.

It should be appreciated that ROIC can be disaggregated into smaller components that provide more insight into the performance of the asset under review. This disaggregation process can continue to levels with more and more actionable components. For instance, by substituting Equation 6 in to Equation 3, ROIC may be redefined as suggested Equation 7.

$$ROIC=EBITA/I\text{-}CAP*(1-\text{cash tax rate}) \quad (\text{Eq. 7})$$

ROIC may be further decomposed through simple manipulation of Equation 7 to produce Equation 7'.

$$EBITA/I\text{-}CAP=(EBITA/Revenue)*(Revenue/I\text{-}CAP) \quad (\text{Eq. 7'})$$

Equation 7' may be substituted into Equation x to produce Equation 8:

$$ROIC=EITA/Revenue*Revenue/I\text{-}CAP*(1-\text{cash tax rate}) \quad (\text{Eq. 8})$$

In Equation 8, the ratio of EITA to Revenue represents a company's operating margin and the ratio of Revenue to Invested Capital represents that company's capital utilization.

Figure 11:
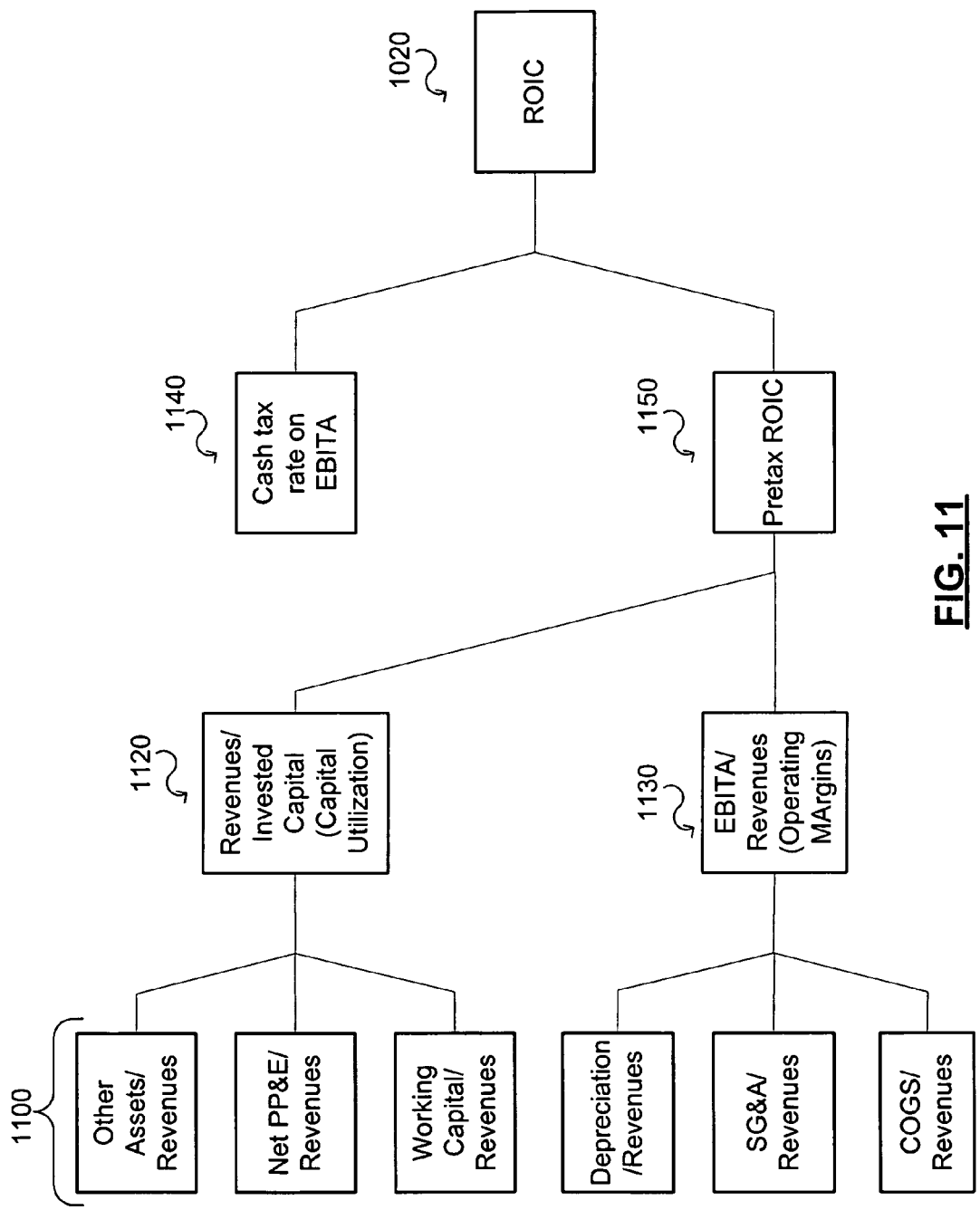

As depicted in FIG. 11, the component metrics and calculations used to calculate ROIC 1020 may be conceptually broken down into a tree logic 1100 to gain insight concerning a company's value and cost levers. Specifically, FIG. 11 depicts various inputs 1110 that may be used to calculate operating margin 1130 and capital utilization 1120. The operating margin 1130 and capital utilization 1120 are then summed to determine pretax ROIC 1140, which is adjusted by a tax rate on EBITA 1150 to calculate actual ROIC 1020.

Referring again to FIG. 10, the calculation of the company's spread 1010 also is dependent upon a previous calculation of the Weighted Average Cost of Capital ("WACC") 1030. The WACC of the assets of a target company can be thought of as representing the opportunity cost of investors for putting their money into the company's asset. It is the sum of the cost of debt holders and the cost of equity holders, each weighted by their share of the overall value of the asset. Thus, WACC may be calculated using Equation 9:

$$WACC=\text{weighted cost of debt}+\text{weighted cost of equity} \quad (\text{Eq. 9})$$

The weighted cost of debt ("WCD") in Equation 9 may be calculated using Equation 10:

$$WCD=K_d*(1-t)*D/(D+E) \quad (\text{Eq. 10})$$

where
$K_d$ is the cost of debt,
t is the tax rate on the debt,
D is the market value of the debt, and
E is the market value of the equity.

In Equation 10, the product of $K_d$ and (1-t) represents the after tax cost for the debt and the ratio of the market value of the debt to the cost of the total debt and equity [D/(D+E)] represents the weighting factor for the debt. In the same way, the weighted cost for equity (WCE) may be calculated using Equation 11, $$WCE=K_e*E/(D+E) \quad (\text{Eq. 11})$$

where $K_e$ is the cost of equity, and the ratio of the market value of the equity to the market of the total debt and equity [E/(D+E)] is the weighting factor for the equity.

In most cases, the cost of capital for debt ($K_d$) is simply the yield to maturity of the bond at current market prices, adjusted for taxes. By definition, the Cost of Debt, $K_d$, is the marginal rate for each time period. The actual marginal rates for each time period may be hard to determine in many circumstances, so the cost of debt $K_d$ optionally may be estimated by the company's yield to maturity on long-term debt, such as the cost for 5 to 10 year debt. This type of information is readily available for most publicly traded companies. Similarly, the tax rate t, representing current/expected marginal tax rate for the debt holder may be estimated using the company's current/expected marginal tax rate, which may be easily estimated or calculated using publicly available information.

In the absence of publicly traded debt, the cost of debt $K_d$ can be determined by using the company's credit ratings. For instance, the cost of debt can be estimated by approximating the credit rating based on financial ratios such as debt/capital and times interest earned.

The other portion of WACC, the cost of equity $K_e$ may be calculated using the capital asset pricing model ("CAPM"). The capital asset pricing postulates that the investors set their opportunity cost of capital equal to the returns on risk-free securities, plus a premium for the systematic risk of the individual stock. In particular, the cost of equity $K_e$ may be calculated as provided in Equation 12:

$$K_e=r_f+(r_m-r_f)*\beta \quad (\text{Eq. 12})$$

where
$K_e$ is the opportunity cost of capital for investors in this asset;
$r_f$ is the risk-free rate of return available to all investors;
$r_m$ is the historic market risk premium required to compensate investors for the additional risks associated with equity ownership; and
$\beta$ is the factor by which a given stock's returns differ from the returns of the market portfolio.

The CAPM says that there is a linear relationship between the cost of equity and the riskiness of the assets, as represented by the $\beta$ value. The $\beta$ value is the standardized measure for co-variance of stock returns with aggregate market return. A stock having a high $\beta$ value tends to have exaggerated responses to moves by the market, while a low $\beta$ stock tends to have muted responses.

The risk-free rate ($r_f$) represents the yield-to-maturity on long-term government bonds. For each year's cash flow, $r_f$ is the return on riskless assets of corresponding duration. Thus, $r_f$ may be difficult to determine since each year's cash flow has a different discount rate. The risk-free rate yield may be estimating using the maturity on long-term government bonds (in currency of cash flows) for all years of interest. If using the maturity on long-term government bonds during the years of interest causes a material impact due to an undesirably steep yield curve or an unusual cash flow pattern, separate discount rates for each year may be used in the alternative.

Continuing with Equation 12, the market risk premium ($r_m$) may be determined by the forward-looking expected market premium, as tailored to local markets. However, $r_m$ is an area of intense debate between academics, bankers and consultants. Estimates for $r_m$ may vary greatly depending, for instance, on the mean used, the time period examined, and whether $r_m$ is evaluated backwards or forwards. For simplicity, $r_m$, for example, may optionally be estimated as 5% for all developed markets, which corresponds to the historical average return.

Continuing with Equation 12, the β value for a publicly traded company, a private company, or a business group is a forwarding looking β value reflecting company-specific volatility. Thus, predicted β values are generally preferred over historical β values, but β calculations from different sources can vary significantly. In particular, a β value for a publicly traded company is available through various resources. For instance, Barra®, Inc. of Berkeley, Calif. publishes a listing of β values for companies in various industries, and this listing may be used to define a β value for the company as described above. The β values published by BARRA are calculated using the past price behavior of the stock and market over the past five years and are calculated relative to the local portion of the Financial Time Actuaries World Index. Other organizations publishing β values for publicly traded companies include Bloomberg, Standard & Poor's, and Valueline.

The β value for the publicly traded company beta may be located through one of the commercial listings and used unless the β value is substantively different from peer group values. In particular, if the β value is substantially different from a β value for the relevant industry, then the industry β value should be used in Equation 12 unless a clear rationale exist for the difference in the company's β value. In selecting related companies in the relevant industry for comparison, each company included in a diagnostic should adhere to a logical rational and set of criteria.

With a business unit or private company, the β values may be taken from related publicly traded organizations with similar capital structures. More specifically, the first step 510 is to identify listed companies that operate in the same field and to determine the β value for these related businesses. An initial estimate of a β value for the Business Unit/Private Company is calculated by averaging or otherwise combining the unlevered betas of the related companies. Next, the financing structure of the Business Unit/Private Company is evaluated using known techniques to estimate the effect of the financing structure on the β value, as described in greater detail below. Consequently, a relevered β value for the Business Unit/Private Company is formed by adding in any impact of the financing structure.

As described above, the β value calculating methodology includes adjusting the β value for the capital structure of the company of interest, since β values tend to increase as companies become more highly leveraged. To reflect this relationship between leverage and β value, Equation 13 may be used to modify reference β value(s) according to the company's debt-to-equity ratio.

$$B_U = \frac{B_L}{\left[1 + (1 - T_c) * \frac{D}{E}\right]} \quad \text{(Eq. 13)}$$

Where:
$\beta_U$=beta without leverage;
$\beta_L$=beta with leverage;

$T_c$=the corporate marginal tax rate; and
D/E=the debt-to-equity ratio based on market values.

Example

In this example, a company has the following financial numbers:
$\beta_L$=0.79
$T_R$=40%
E=$2,781 Mill.
D=$747 Mill.
$R_F$=5%
MRP=5%
$K_D$=7%

For the company in the analysis, the β value is preferably unlevered using Equation 13, as described above. Thus, the company has $$\beta_U = \beta_L / [1 + (1 - T_R) * D/E]$$
$$= 0.79 / [1 + (1 - 40\%) * (747/2781)]$$
$$= 0.68$$

As described above, the unlevered beta values $\beta_U$ should generally fall close to the industry average (within a range of +/−0.25). Unexplained outliers should be adjusted to the industry average to account for measurement errors in calculating betas. For instance, if the industry for the company in this example has an average $\beta_U$ of 0.35, the difference between the two $\beta_U$ values exceeds 0.25. Accordingly, the cost of equity should be recalculated using the industry average $\beta_U$ value. Returning again to Equation 12 from above and using the industry average $\beta_U$ value ($\beta_{U(Industry)}$), we can make the following calculations:

$$\beta_U = \beta_{U(Industry)} / [1 + (1 - T_R) * D/E]$$
$$= .35 / [1 + (1 - 40\%) * (747/2781)]$$
$$= .41$$

Once the β value for the company is relevered, a revised WACC may be calculated as follows. First the Weighted Cost of Debt is determined using Equation 10.

$$\text{Cost of Debt} = K_D * (1 - T_R)[D/(D + E)]$$
$$= 7\% * (1 - 40\%)(747/3528)$$
$$= .9\%$$

Likewise, the Weighted Cost of Equity may be determined using Equation 11.

$$K_E = [R_F + (R_M - R_F) * \beta_L] * [E/(D + E)]$$
$$= [4.93\% + (5\%)(.41)] * (2781/3528)$$
$$= 7.0\% * 78.8\%$$
$$= 5.5\%$$

Thus, the WACC for the company in this example is the sum of the Weighted Cost of Debt and the Weighted Cost of equity, or 6.4%.

Further with regard to FIG. 10, operating leases may require special treatment in the calculation of both ROIC 1020 and WACC 1030. For instance, a company may have the option of leasing or purchasing equipment. In substance, operating leases represent a type of financing similar to long-term debt. In application, leases are treated very differently from debt in the financial statements. For instance, a company may assume long-term debt to pay for purchased equipment. Using the logic 1000 and equations described above, companies that lease would have much higher ROIC. Accordingly, a preferred embodiment of the present invention makes an adjustment to prevent manipulation of the values calculated for ROIC through accounting decisions. Specifically, operating leases may be adjusted on the financial statements to treat the leases as debt and fixed assets by decreasing COGS in the income statement by the amount of the lease and increasing the PP&E and Debt values in the balance sheet by the next year's lease payment divided by the cost of a debt equal to the value of the leased items.

Additionally, retirement liabilities may also require special treatment in the calculation of both ROIC 1020 and WACC 1030. Retirement Liabilities represent two types of costs, so-called "FAS 87" liabilities for unfunded pension liabilities and so-called "FAS 106" liabilities for unfunded post-retirement benefits other than pensions. According to standard accounting conventions, unfunded retirement liabilities are treated very differently from debt in the financial statement even though the unfunded retirement liabilities represent a type of financing similar to long-term debt. As a result, companies with unfounded retirement liabilities would have understated NOPLAT and Invested Capital, thereby altering the final return on investment for shareholders as calculated through method 300. In the income statement, the retirement liabilities would cause increases/decreases in Liability as reflected in operating expense. Similarly, retirement liabilities included on a balance sheet as a long-term liabilities and reduces Invested Capital on a "where to" and a "where from" basis. Thus, a preferred implementation of the present invention adjusts for retirement liabilities in financial statements by treating the retirement liabilities as debt. Specifically, the SG&A in the Income Statement is reduced by the product of the Liability Amount and the Cost of Debt. For the underlying calculation of NOPLAT necessary for determining ROIC 1020, implied interest expense is estimated on the liability for the year, and a portion of operating expenses equal to this amount is reclassified as interest expense. Similarly, the Balance Sheet is modified by reducing the other long-term liabilities by the Liability Amount and conversely increasing the debt by the Liability Amount.

Figure 12:
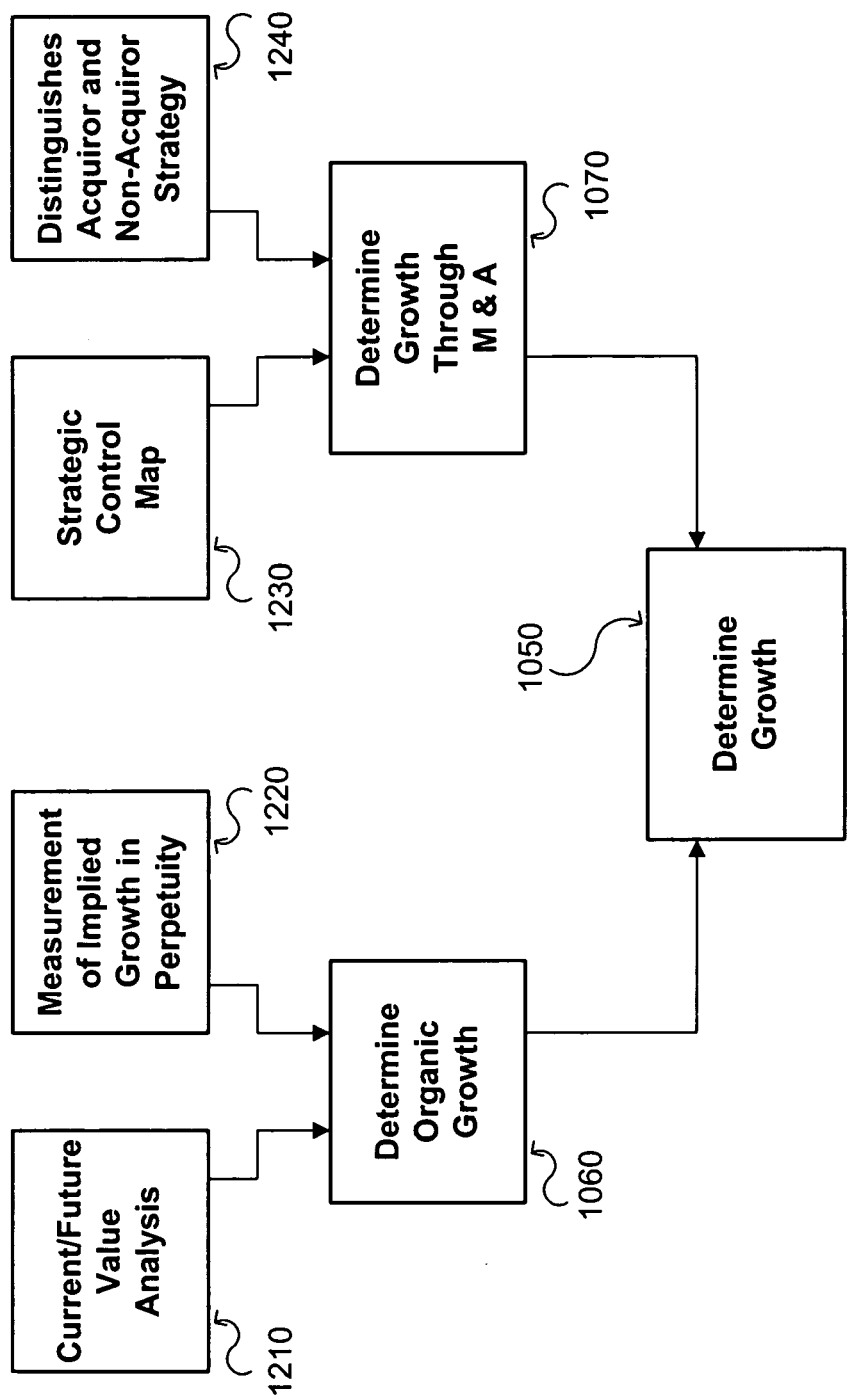

Returning again to FIG. 10, the cost reduction analysis logic 1000 further includes the calculation of the change in the value of the company caused by growth 1050, which is comprised of organic growth 1060 and growth through mergers and acquisitions ("M&A growth") 1070. Turning now to FIG. 12, the calculation of organic growth 1060 and M&A growth 1070 is also represented in tree logic. Calculation of organic growth 1060 generally requires current/future value analysis 1210 and measurement of implied growth in perpetuity 1220. The calculation of M&A growth 1070 entails the use of a strategic control map 1230 and distinguishes acquirer and non-acquirer strategies 1240 as discussed hereafter.

The calculation of organic growth 1060 uses an analysis of the current and future value of the company to breakdown of the market value of a firm into a current operations value and a future value of investments. In particular, the present invention looks to the value of the company and identifies the value of current operations. The difference between the current value of the company and the value of current operations represents the expected future growth value, as specified in Equation 14.

$$\text{Expected (Growth)} = \text{Enterprise Value} - \text{Value of Current Operations} \quad \text{(Eq. 14)}$$

In Equation 14, the Enterprise Value represents the value of the enterprise, which is typically reflected as the market value of debt and equity (the market value of debt plus the market capitalization of common and preferred shares). The value of current operations reflects the value of the current operations in perpetuity. Typically, the value of current operations is calculated by showing current NOPLAT in perpetuity, as represented by the ratio of NOPLAT to WACC. Thus, the future value determined in Equation 14 represents the markets' expectation regarding the ability to sustain current NOPLAT in perpetuity.

Returning to the tree logic 1200 of FIG. 12, determining organic growth 1060 requires the measurement of implied growth in perpetuity 1220. By analyzing long-term expectations about growth implied in a company's stock price, companies with potential growth challenges may be identified. The implied growth represents investors' expectations of future cash flows in perpetuity. The measurement of implied growth in perpetuity begins with a determination of the enterprise value of the firm (market debt plus equity), which reflects the market's current value assessment of the company. The enterprise value of the firm is a readily available figure that is available through the share price. Next, the measurement of implied growth in perpetuity continues with a forecast of free cash flow based on consensus analyst opinions. In particular, free cash flow may be estimated for a future period, such as the next five years, based on analysts' forecasts. The measurement of implied growth in perpetuity continues by discounting the above-described free cash flow forecasts to determine how much of the current enterprise value is reflected in the markets estimate of free cash flow for the forecasted period, such as the next five years. The present value of the free cash flow estimate for the prediction period may then be subtracted from the enterprise value to calculate the continuing value of the business. The continuing value is then undiscounted to determine its present value. For instance, the continuing value of the business may be divided by $[1/1+\text{WACC}]^n$, where n represents the number of periods of prediction.

The continuing value is then used to calculate growth g using Equation 15:

$$\text{Continuing Value} = [\text{NOPLAT}(1-g/\text{ROIC})]/(\text{WACC}-g) \quad \text{(Eq. 15)}$$

Using simple algebra to solve for g, Equation 15 may be transformed to Equation 15':

$$g = -[\text{NOPLAT} - (CV)(\text{WACC})]/[CV - (\text{NOPLAT}/\text{ROIC})] \quad \text{(Eq. 15')}$$

where the

NOPLAT'=the value for NOPLAT in year after the cash flow predictions (typically year 6 after a five year prediction);

CV=undiscounted continuing value calculated previously

WACC=WACC as of year 0 of the evaluation; and

ROIC=WACC plus a premium, such as 1%.

Please note that the ROIC premium above WACC is largely dependent on the industry. Commodity-based industries will typically experience industry returns equal to WACC in perpetuity, while industries with high barriers to entry (such as pharmaceuticals) may have a premium above WACC of 2%).

In the absence of free cash flow estimates, g can be solved using EPS estimates, as embodied in Equation 16:

$$g = [NI - (CV)(COE)]/[CV - (NI/ROE)] \quad \text{(Eq. 16)}$$

Where
NI=Net Income after the period of cash flow predictions;
CV=undiscounted continuing value calculated previously;
COE=$K_e$ as of year 0 from the WACC calculation; and
ROE=COE plus a premium, such as 1%, as described above.

A negative value for Current Operations may warrant further study of historical trends in NOPLAT or may suggest exceptional changes in deferred taxes. In the same way, Growth can not be greater than WACC in the Continuing Value calculation of step 312, as described in greater detail below.

Without discerning between M&A growth and organic growth, revenue growth for some companies may seem exceptional because M&A activity may greatly affect the ROIC values for a company. Thus, revenue associated with acquired or divested units should be incorporated in an analysis of organic revenue growth. Typical adjustments may include subtracting acquisition revenues in the year purchased and all subsequent years; adding back divested revenue in the year of the divestiture and all subsequent years; or calculating Compound Annual Growth Rate (discussed below) using final revenue divided by the sum of companies revenue at the beginning of the period. Possible additional adjustments include, discounting acquisition revenues by 5-10% to account for revenue dis-synergies outside of management control, pro-rating revenue adjustments in the first year based upon the timing of the transaction; or checking company news archives to ensure a complete transaction list is obtained. Generally, adjustments should not be made for carve-outs or stock purchases in subsidiaries where revenues consolidated in the company's financial reports do not change.

Referring now to the calculation of M&A growth 1070, the growth of a company's value attributed through mergers and acquisitions may be determined in part through the use of a strategic control map 1230. A strategic control map graphically illustrates shows how M&A activity has affected a relevant industry's overall structure, as well as the relative position of members of that industry. Strategic control maps generally compare the performance of companies (e.g., as embodied by market-to-book values ratios or the market values) to the size or book values of the companies.

The industry may then be divided into categories, such as "Niche/Specialist" businesses that are small but have high performance, "Leaders" that are large and perform will, "Targets" that are small and do not perform well, and "Lumbering Giants" that are large but do not perform well. In general, the Niche/Specialist businesses have high returns from small amount of invested capital; compete in niche/value added segments; typically are not acquisition targets by virtue of market value; face challenges to grow given their niche orientation; and may be become attractive targets for acquisition of their market value because of their unique capabilities. In contrast, the marker leaders usually have high returns from large amount of invested capital; compete in broad segments; typically offer significant acquisition opportunities by virtue of market multiples; utilize scale effectively; but may face challenges to identify value-creating growth opportunities given their large size. Target companies have low returns from small amount of invested capital; typically have domestic competitors in global industries; are vulnerable to competitors that can generate higher returns on the same asset base; and may face challenges to improve operations or be taken out. Lumber giants having large size but poor performance have low returns from large amount of invested capital; have an inability to leverage scale; despite low market value, are typically not popular targets for acquisitions because their large sizes help to deter purchasers; and face the challenge of correcting for under performing operations to generate greater returns on invested capital.

Continuing with the calculation of M&A growth 1070, the financial data of the target company should also be accessed using acquirer and non-acquirer strategies 1240. As described above, unadjusted calculations incorrectly show high growth rates for acquisitive companies but adjusting for M&A activity reveals a clearer picture of organic growth. Return to Shareholder performance of acquisitive and non-acquisitive competitors may be compared using the above-described techniques to highlight the relative importance of M&A. For instance, active acquirers' Total Return to Shareholders may be compared to Competitors in related industries.

Absolute growth for a company of interest is provided in Equation 17:

$$\text{Absolute Growth} = \left(\frac{\text{Ending Stock Price} + \text{Accumulated Dividends}}{\text{Beginning Stock Price}}\right) - 1 \quad \text{(Eq. 17)}$$

The absolute growth rate may then be modified, as shown in Equation 18, to calculate the Compound Annual Growth Rate (CAGR)

$$CAGR = \left(\frac{\text{Ending Stock Price} + \text{Accumulated Dividends}}{\text{Beginning Stock Price}}\right)^{\frac{1}{n}} - 1 \quad \text{(Eq. 18)}$$

where n is the number of periods of interest. For instance, if a stock appreciates from $50 to $70 and pays $3 in dividend in a 3 year period (i.e., n=3), then $$CAGR = [(70+3)/50]^{1/3} - 1 = 13.4\%$$

In situations in which there have been no material changes to the stock, the CAGR may represent company's growth. However, various events may modify the value of a stock without materially changing the TRS. For instance, a stock split generally represents an increase in the number of shares and a reduction in the price per share with no associated change in value. In the same way, a portion of a company may be spun off to form a new business with its own stock. The value of the original company's stock will decrease, but this decrease will be offset by the value of stocks issued by the spin-off company.

Referring back again to FIG. 10, the spread 1010 is the difference of the ROIC 1202 and the WACC 1030. The growth 1050 is the CAGR, adjusted as necessary. The total return to shareholders (TRS) then entails a summing of spread and the growth.

It should be appreciated that the calculation of TRS may be sensitive to the start date. In general, TRS should be calculated over a full business cycle while avoiding start dates that include extraordinary company events such as the resignation/hiring of management officials; earnings releases; regulatory changes; or major changes in corporate structure. In the same way, start dates affected by global economic events should be avoided since can global economic events falsely inflate/deflate industry returns. Preferably, TRS is calculated over several time periods to ensure the results are similar regardless of the starting point and timeframe. Thus outliers and anomalies should be identified and avoided. If necessary, TRS may be calculated by comparing the company to those who have more varied tiering of stock value. Optionally, logical breakdown by tiering may be used to identify relevant chosen competitors, or tiering may be based on a median composite index.

Upon determination of TRS and other relevant metrics and diagnostic ratios, the target company may be evaluated to determine potential value and cost drivers as described above. The value levers and cost levers may be identified through the iterative, hypothesis driven process described above with the aid of the cost lever analysis tool. While each industry is unique and has its own set of value levers, nevertheless some common patterns of value levers and cost levers cross industries, and certain cost and value drivers and levers for an industry often can be found to demonstrate a strong correlation with TRS, helping to explain why some companies create value while others destroy value.

The foregoing description of the preferred embodiments of the invention has been presented for the purposes of illustration and description. It is not intended to be exhaustive or to limit the invention to the precise form disclosed. Many modifications and variations are possible in light of the above teaching. For instance, the method of the present invention may be modified as needed to incorporate new communication networks and protocols as they are developed. It is intended that the scope of the invention be limited not by this detailed description, but rather by the claims appended hereto.

The invention claimed is:

1. An electronic network system configured to generate cost reduction strategies for a target company, the network system comprising:
   a computer that is configured to execute:
   a cost lever analysis tool that (1) receives financial data inputs regarding the target company, (2) calculates normalized diagnostic information regarding the cost structure of the target company based on the financial data inputs and a β value of the target company, (3) displays the normalized diagnostic information, (4) receives cost levers based on the normalized diagnostic information, and (5) transmits the cost levers;
   a cost reduction strategy tool that receives the cost levers, the strategy tool including:
      a generation module that generates a cost reduction strategy for one or more of the cost levers;
      a linking module that correlates the cost reduction strategy with corresponding ones of the cost levers;
      an implementation module that generates implementation information related to implementing the cost reduction strategy; and
      an output module that outputs the cost reduction strategy and the implementation information,
   and
   wherein the β value of the target company is determined by (1) identifying comparable businesses that operate in the same field as the target company, (2) determining the β values of the comparable businesses, (3) averaging the β values of the comparable businesses to determine an unlevered β value, (4) estimating an effect of the financing structure of the target company using the unlevered β value, and (5) determining a relevered β value for the target company by adding in the effect of the financing structure.

2. The network system according to claim 1, wherein the implementation information includes at least one of case studies, implementation plans, integration implications, and sample benefit and impact forecasts.

3. The network system according to claim 2, wherein the implementation information comprises hyperlinked documents.

4. The network system according to claim 3, wherein the documents can be cross-linked to each other.

5. The network system according to claim 2, wherein a plurality of case studies are correlated with each cost reduction strategy.

6. The network system according to claim 5, wherein the implementation information includes case studies derived from more than one industry.

7. The network system according to claim 1, wherein the output module generates a cost-reduction strategy template for the target company.

8. The network system according to claim 7, wherein the cost reduction strategy template includes the implementation information.

9. The network system according to claim 8, wherein the implementation information includes at least one of economic impacts, strategy goal summaries, expected implementation schedules and plans, projected cost considerations, and projected key benefits.

10. The network system according to claim 1, wherein the cost lever analysis tool further comprises a calculation module that calculates a total return to shareholders using a calculated return on invested capital, a calculated weighted average cost of capital, a calculated organic growth, and a calculated merger and acquisition growth based on the financial input data.

11. The network system according to claim 1, wherein the cost lever analysis tool generates summary reports, the summary reports including—at least one of metrics or diagnostic ratios of the target company.

12. The network system according to claim 11, wherein the summary reports include charts or diagrams comparing the metrics or the diagnostic ratios to baseline industry information.

13. The network system according to claim 12, wherein the baseline industry information comprises metrics or diagnostic ratios pertaining to industry competitors of the target company.

14. The network system according to claim 12, wherein the summary reports include shareholder return graphs, the shareholder return graphs comparing a growth compound annual growth rate to a spread for the target company and industry peers of the target company.

15. The network system according to claim 1, wherein at least one of the cost lever analysis tool, the cost reduction strategy tool, and the output module is located on a server electronically accessible by remote users.

16. A computer-readable storage medium encoded with instructions which, when executed on a processor, perform a method comprising:
   receiving financial data inputs regarding a target company;
   calculating normalized diagnostic information regarding the cost structure of the target company based on the financial data inputs and a β value of the target company, the β value of the target company being determined by (1) identifying comparable businesses that operate in the same field as the target company, (2) determining the β values of the comparable businesses, (3) averaging the β values of the comparable businesses to determine an unlevered β value, (4) estimating an effect of the financing structure of the target company using the unlevered β value, and (5) determining a relevered β value for the target company by adding in the effect of the financing structure;

displaying the normalized diagnostic information;

receiving cost levers of the target company based on the normalized diagnostic information;

generating a cost reduction strategy for one or more of the cost levers;

correlating the cost reduction strategy with corresponding ones of the cost levers;

generating implementation information related to implementing the cost reduction strategy; and outputting the cost reduction strategy and the implementation information.

17. The computer-readable storage medium according to claim 16, wherein the method further comprises generating a cost reduction strategy template for the target company.

18. The computer-readable storage medium according to claim 17, wherein the cost reduction strategy template includes the implementation information.

19. The computer-readable storage medium according to claim 18, wherein the implementation information includes at least one of economic impacts, strategy goal summaries, expected implementation schedules and plans, projected cost considerations, and projected key benefits.

20. The computer-readable storage medium according to claim 16, wherein the implementation information includes at least one of case studies, implementation plans, integration implications, and sample benefit and impact forecasts.

21. The computer-readable storage medium according to claim 20, wherein the implementation information comprises hyperlinked documents.

22. The computer-readable storage medium according to claim 21, wherein the documents can be cross-linked to each other.

23. The computer-readable storage medium according to claim 20, wherein a plurality of case studies are correlated with the cost reduction strategy.

24. The computer-readable storage medium according to claim 23, wherein the implementation information includes case studies derived from more than one industry.

25. The computer-readable storage medium according to claim 16, wherein the calculating normalized diagnostic information comprises calculating a total return to shareholders using a calculated return on invested capital, calculating a weighted average cost of capital metric, calculating an organic growth metric, and calculating a merger and acquisition growth metric.

26. The computer-readable storage medium according to claim 16, wherein the displaying of the normalized diagnostic information comprises generating summary reports, the summary reports including at least one of metrics or diagnostic ratios of the target company.

27. The computer-readable storage medium according to claim 26, wherein the summary reports include charts or diagrams comparing the metrics or the diagnostic ratios to baseline industry information.

28. The computer-readable storage medium according to claim 27, wherein the baseline industry information comprises the metrics or the diagnostic ratios pertaining to industry competitors of the target company.

29. The computer-readable storage medium according to claim 27, wherein the summary reports include shareholder return graphs, the shareholder return graphs comparing a growth compound annual growth rate to a spread for the target company and industry peers of the target company.

30. The computer-readable storage medium according to claim 16, wherein the computer-readable storage medium is located on a network accessible to users to perform the method, and wherein the financial data inputs are received electronically by the network from a remote electronic financial data repository.

31. The electronic network system of claim 1, wherein the cost lever analysis tool identifies the cost levers.

32. The electronic network system of claim 1, wherein the implementation information constitutes an approach for implementing the cost reduction strategy.

* * * * *